United States Patent [19]

Dragon et al.

[11] Patent Number: 5,021,673

[45] Date of Patent: Jun. 4, 1991

[54] WEB TRANSPORT WITH ANTI-SKEW ARRANGEMENT

[75] Inventors: Thomas Dragon, Northville; John Hylan, Birmingham; Kenneth Berkoben, Plymouth, all of Mich.

[73] Assignee: Unisys Corp. (Formerly Burroughs Corp.), Detroit, Mich.

[21] Appl. No.: 419,423

[22] Filed: Oct. 10, 1989

[51] Int. Cl.[5] .......... G01N 21/86

[52] U.S. Cl. .......... 250/548; 271/227

[58] Field of Search .......... 250/548, 561; 226/15, 226/16, 17, 21, 22, 23; 271/227, 228; 356/399, 400

[56] References Cited

U.S. PATENT DOCUMENTS

| | | | |
|---|---|---|---|
| 3,368,726 | 2/1968 | Funk et al. | 226/17 |
| 4,049,213 | 9/1977 | Hank et al. | 250/548 |
| 4,694,181 | 9/1987 | Piller | 250/548 |

FOREIGN PATENT DOCUMENTS

| | | | |
|---|---|---|---|
| 0128146 | 7/1984 | Japan | 271/228 |
| 0133148 | 7/1984 | Japan | 271/227 |
| 0215449 | 9/1987 | Japan | 271/227 |
| 0171748 | 7/1988 | Japan | 271/227 |

*Primary Examiner*—David C. Nelms

*Attorney, Agent, or Firm*—John J. McCormack; Mark T. Starr

[57] ABSTRACT

"Anti-wander" web-transport arrangements wherein web-means are intermittently advanced, while being monitored for misalignment along the transport-path, and also being automatically urged back into proper alignment along this path. Preferably, this is done with left and right roll means, one of which is selectively urged more tightly against the web to impart superior advance-thrust and so urge the web back into proper alignment.

14 Claims, 15 Drawing Sheets

Column Number

| ROW | 16 | 15 | 14 | 13 | | 11 | 10 | 9 | 8 | 7 | 6 | 5 | 4 | 3 | 2 | |
|---|---|---|---|---|---|---|---|---|---|---|---|---|---|---|---|---|
| 1 | 6 | 7 | 8 | 9 | A | 0 | 1 | 2 | 3 | 4 | 5 | 6 | 7 | 8 | 9 | A |
| 2 | 5 | 6 | 7 | 8 | A | 9 | 0 | 1 | 2 | 3 | 4 | 5 | 6 | 7 | 8 | A |
| 3 | 4 | 5 | 6 | 7 | A | 8 | 9 | 0 | 1 | 2 | 3 | 4 | 5 | 6 | 7 | A |
| 4 | 3 | 4 | 5 | 6 | A | 7 | 8 | 9 | 0 | 1 | 2 | 3 | 4 | 5 | 6 | A |
| 5 | 2 | 3 | 4 | 5 | A | 6 | 7 | 8 | 9 | 0 | 1 | 2 | 3 | 4 | 5 | A |
| 6 | 1 | 2 | 3 | 4 | A | 5 | 6 | 7 | 8 | 9 | 0 | 1 | 2 | 3 | 4 | A |
| 7 | 0 | 1 | 2 | 3 | A | 4 | 5 | 6 | 7 | 8 | 9 | 0 | 1 | 2 | 3 | A |
| 8 | 9 | 0 | 1 | 2 | A | 3 | 4 | 5 | 6 | 7 | 8 | 9 | 0 | 1 | 2 | A |
| 9 | 8 | 9 | 0 | 1 | A | 2 | 3 | 4 | 5 | 6 | 7 | 8 | 9 | 0 | 1 | A |
| 10 | 7 | 8 | 9 | 0 | A | 1 | 2 | 3 | 4 | 5 | 6 | 7 | 8 | 9 | 0 | A |

Print Drum 10-Row Sector Configuration

FIG. 10

Column Number

| ROW | 16 | 15 | 14 | 13 | | 11 | 10 | 9 | 8 | 7 | 6 | 5 | 4 | 3 | 2 | |
|---|---|---|---|---|---|---|---|---|---|---|---|---|---|---|---|---|
| 1 | 6 | 7 | 8 | 9 | <> | 0 | 1 | 2 | 3 | 4 | 5 | 6 | 7 | 8 | 9 | <> |
| 2 | 5 | 6 | 7 | 8 | A | 9 | 0 | 1 | 2 | 3 | 4 | 5 | 6 | 7 | 8 | A |
| 3 | 4 | 5 | 6 | 7 | A | 8 | 9 | 0 | 1 | 2 | 3 | 4 | 5 | 6 | 7 | A |
| 4 | 3 | 4 | 5 | 6 | A | 7 | 8 | 9 | 0 | 1 | 2 | 3 | 4 | 5 | 6 | A |
| 5 | 2 | 3 | 4 | 5 | A | 6 | 7 | 8 | 9 | 0 | 1 | 2 | 3 | 4 | 5 | A |
| 6 | 1 | 2 | 3 | 4 | A | 5 | 6 | 7 | 8 | 9 | 0 | 1 | 2 | 3 | 4 | A |
| 7 | 0 | 1 | 2 | 3 | A | 4 | 5 | 6 | 7 | 8 | 9 | 0 | 1 | 2 | 3 | A |
| 8 | 9 | 0 | 1 | 2 | A | 3 | 4 | 5 | 6 | 7 | 8 | 9 | 0 | 1 | 2 | A |
| 9 | 8 | 9 | 0 | 1 | A | 2 | 3 | 4 | 5 | 6 | 7 | 8 | 9 | 0 | 1 | A |
| 10 | 7 | 8 | 9 | 0 | A | 1 | 2 | 3 | 4 | 5 | 6 | 7 | 8 | 9 | 0 | A |

Print Drum 10-Row Sector Configuration

FIG. 11

WEB TRANSPORT WITH ANTI-SKEW ARRANGEMENT

FIELD OF THE INVENTION

This invention relates to mechanisms for transporting continuous web means; and especially to means for detecting and controlling/correcting web-misalignment.

BACKGROUND, FEATURES

In the arts involving means for advancing and aligning continuous web means, workers are well aware how difficult, yet necessary, it is to control web alignment, and particularly to detect, and (if possible) automatically correct, misalignment ("wander") thereof. One object hereof is to do this.

Some web transports also involve print-hammers; and example of such is disclosed in U.S. Pat. No. 4,510,619 to LeBrun et al. issued Apr. 9, 1985 and in U.S. Pat. No. 4,672,186 to Van Tyne issued June 9, 1987. These patents show an encoding system in which documents are continuously advanced past one or more banks of electromagnetically-activated print-hammers. Positioned on the other (non-hammer) side of the document are appropriately-encoded die means, presenting the (OCR or MICR) characters. Between the die and the document is an appropriate magnetic-ink ribbon which applies an ink-image of the die onto the document upon hammer impact. The system is "indexed" so that the required character is imprinted in the appropriate document-space based on timing the hammer strike with selected-die-presentation.

Workers are aware of certain disadvantages in present encoder arrangements; for instance, it is common for either or both the document and the ribbon to be moving during hammer-strike—and smudges or other imperfect imaging can result. Also, an extensive, unwiedly number of die sets and hammers must typically be provided to cover all possible combinations of symbols in all possible sequences (to be imprinted on the document). As will be described, the present invention overcomes these, and other, problems and disadvantages; e.g. by using a "print-drum" with normalized hammer-pressure and with paper-motion and ribbon-motion arrested; by using variable -energy hammer activation; by monitoring hammer movement/impact; by using print drum means with a special alignment mark; by using a servo system/sensor/software combination for controlled deceleration and alignment of document; and by automatically correcting ribbon-wander.

Thus, it is an object hereof to address at least some of the foregoing needs and to provide one or several of the foregoing, and other, solutions.

BRIEF DESCRIPTION OF THE DRAWINGS

These and other features and advantages of the present invention will be appreciated by workers as they become better understood by reference to the following detailed description of the present preferred emobdiments which should be considered in conjunction with the accompanying drawings, wherein like reference symbols denote like elements:

FIG. 6 is a very schematic representation of a part of this transport with an associated velocity-profile, while FIG. 6A is a related showing of a sensor array;

FIG. 8A is a sensor compensation flow chart;

FIG. 10 is a partial showing of the preferred die configuration on such a Drum;

FIG. 11 is a like showing of a modified die configuration including special alignments symbols, and FIG. 11A shows such a symbol in plan-view;

FIGS. 12 and 12A illustrates the Print Drum/Print head array, in side view, together with a ribbon-advance arrangement;

DESCRIPTION OF THE PREFERRED EMBODIMENT

General description, background

The overall Encoder will first be described; then various particular sub-units in detail. The methods and means discussed herein, will generally be understood as constructed and operating as presently known in the art, except where otherwise specified; with all materials, methods and devices and apparatus herein understood as implemented by known expedients according to present good practice.

ENCODER; Overview

Figure 1:
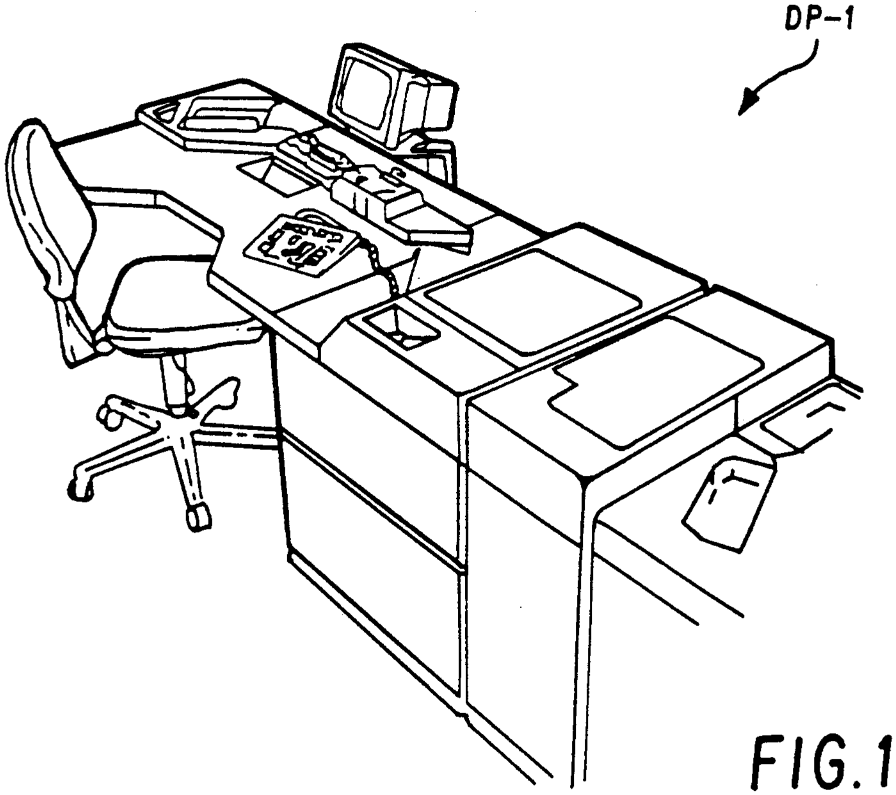
FIG. 1 is a perspective schematic idealized view of a Processor-Encoder arrangement apt for use with the invention.
Figure 2:
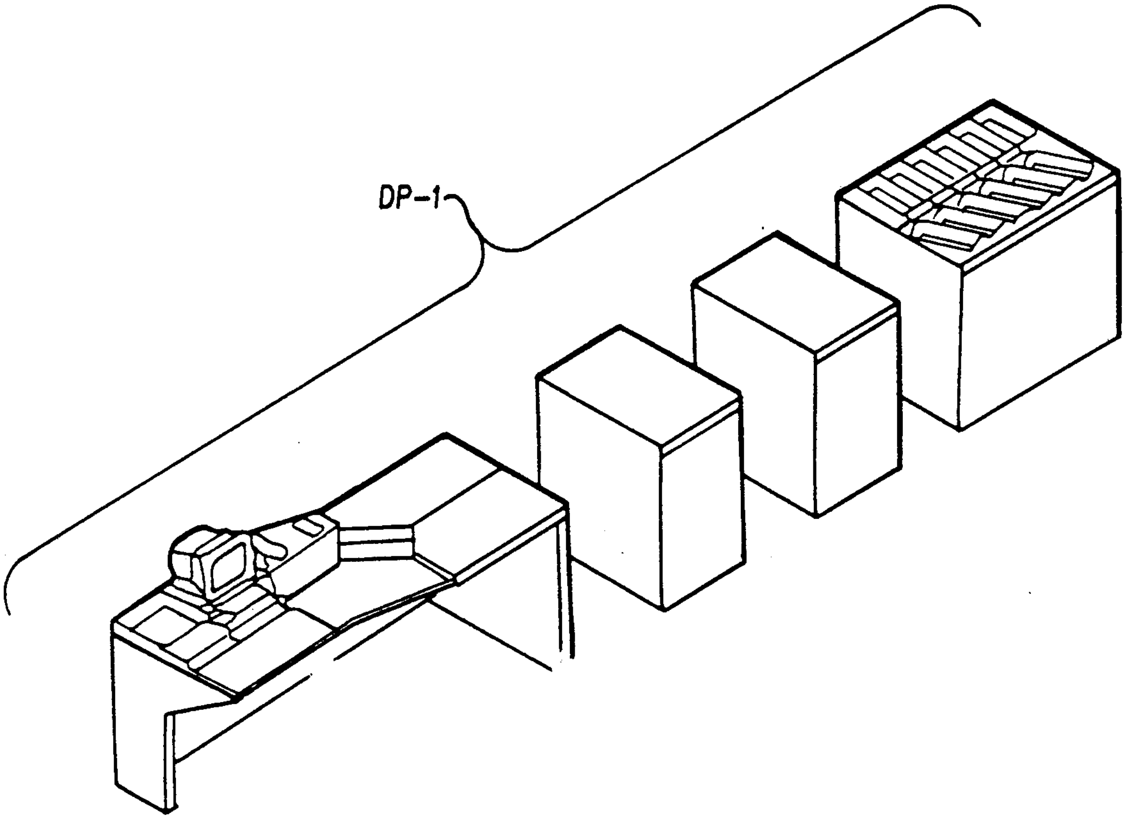
FIG. 2 is a like view of a similar arrangement, exploded-apart.

The subject "High-Speed Power (HSP) Encoder embodiment will be understood as intended for integration (as a module) in an intelligent, stand-alone Document Processor such as DP-1 in FIGS. 1, 2. DP-1 will, for instance, by understood as capable of screening MICR and/or OCR (optical character recognition) documents (e.g. in a single pass), in a system that can automatically feed, read, endorse, encode, microfilm (e.g. see module DP-MF), balance and sort (e.g. see Pocket Module DP-PM cf. 4–36 pockets) as well as capture document data and transmit document-based transactions.

This HSP Encoder module comprises a self-contained document transport, an encoding printer, a servor system, associated electronics, and an interface to the document processor. The Encoder transport system accepts documents from the workstation during "flow mode" (i.e. at a track speed of 100 inches per second). The transport system is indicated very schematically in FIG. 4; it will be understood to align each document to a horizontal track level and move it into a servo-controlled transport segment, located at the input side of the encoding printer (Document alignment is performed in the HSPE Transport to correct incoming "document-skew".)

The servo system decelerates and stops the document at a precise location for the printer to encode the predetermined amount and transaction code fields. That is, a document-positioning system stops the document at the required position in the printer, verifies proper alignment, and accelerates the document to downstream modules after printing (cf. for six-inch documents this means a thru-put of about 400/min; DP-1 reduces its feed-rate during encoding). During deceleration of an individual document, the remainder of the transport track continues at "flow mode" speed.

A 16-column impact drum printer encodes the MICR characters—but only if the document is properly spaced, aligned, and positioned and only when correct ribbon movement is assured.

After the document is encoded, the transport system accelerates it to "flow mode" speed and moves it to the next module.

Encoder Module HSPE will be understood to encode 16 consecutive "magnetic ink character recognition" (MICR) characters on documents as fast as 400 six-inch document per minute. It will imprint (encode) information which is determined at a Host before each encoding pass (supplied to the Encoder for each document to be encoded.)

Figure 3:
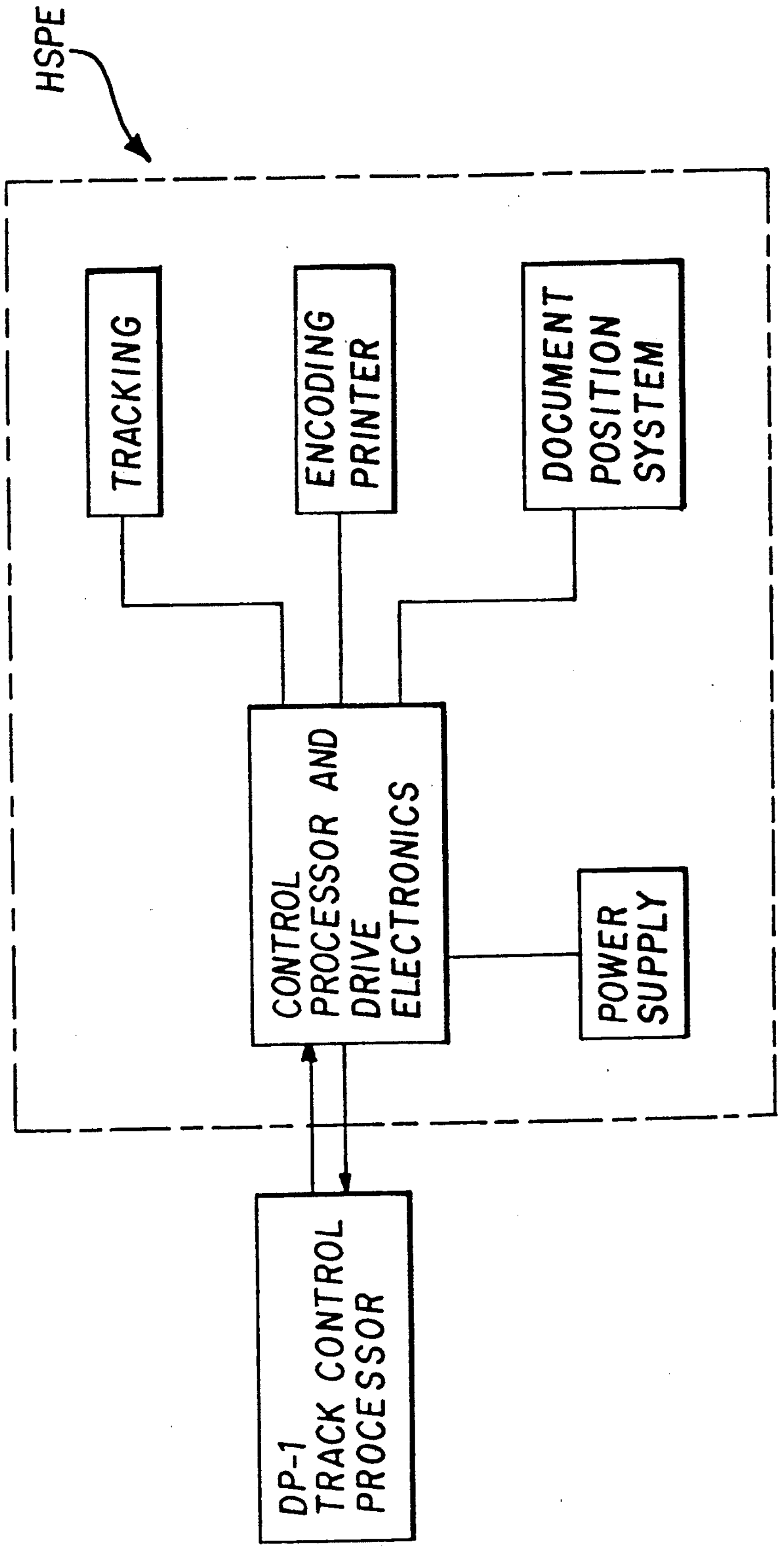
FIG. 3 is a block-diagram showing of an Encoder embodiment made according to the invention.
Figure 4:
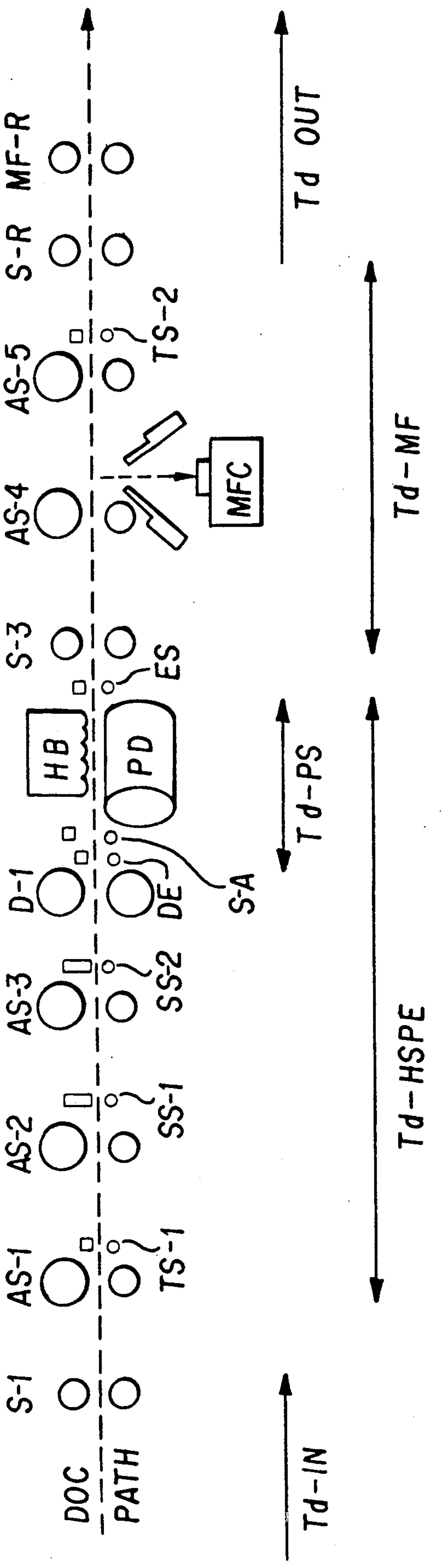
FIG. 4 is a very schematic block diagram top view of an alignment/print station portion of this embodiment.
Figure 18:
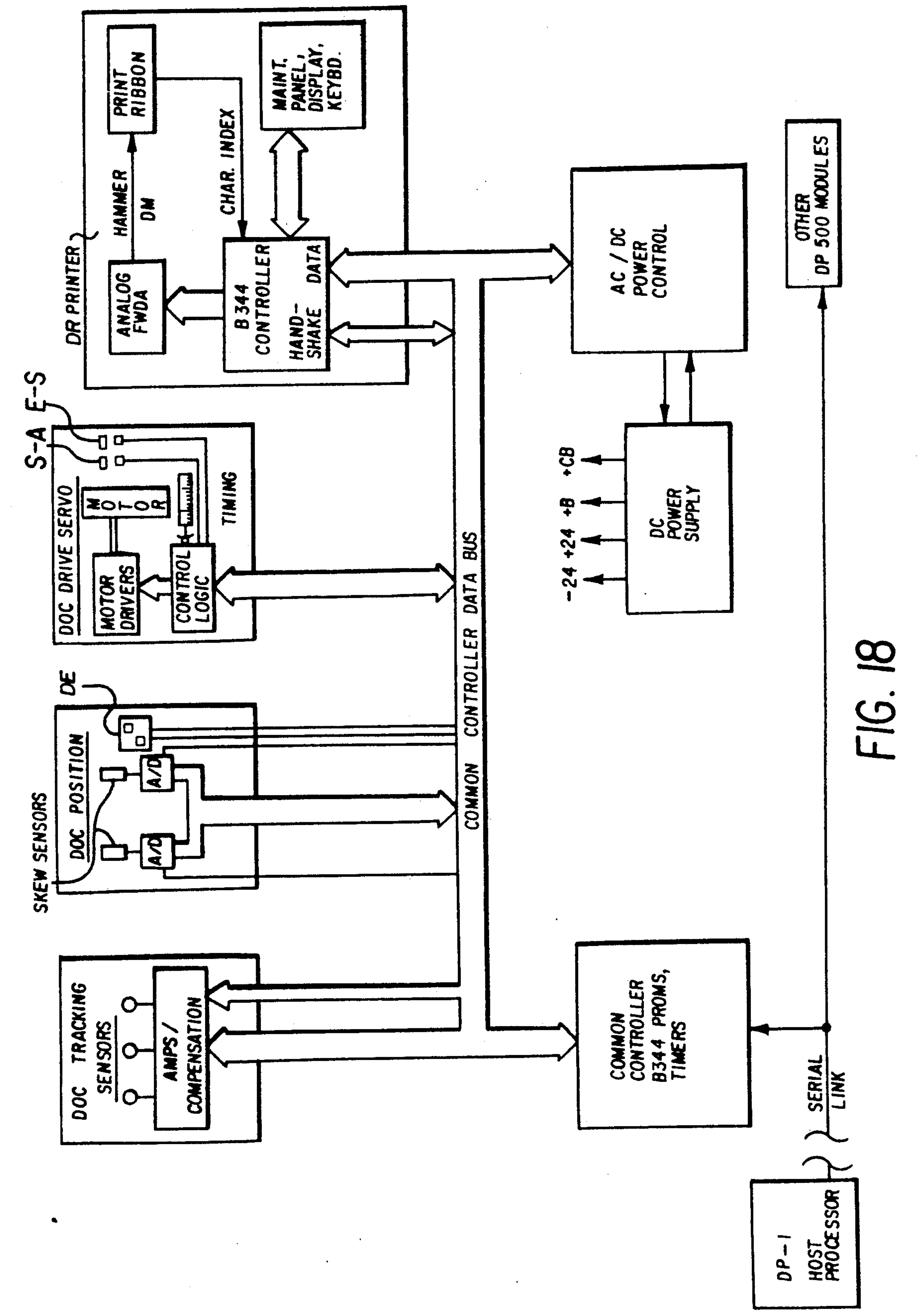
FIG. 18 is a block diagram of signal-flow between related Encoder sub-units.

FIGS. 3, 18 are functional-Block Diagrams of the HSP Encoder module, while FIG. 4 a schematized plan view of it transport path.

In summary, then, the HSPE performs the functions (in concert with DP-1 etc.) of:

Transporting documents between upstream and downstream modules, tracking documents to detect and report handling error conditions; and MICR-encoding amount and transaction code information on the document.

The control processor and drive electronics of the HSPE provide a logical interface to the DP-1 Host processor system, and they control, and time, the main sequence of its operations, while providing drive power for electrical and electromechanical devices.

Various features of this Encoder module will be noteworthy: e.g. a print drum having a novel "alignment mark" and having novel variable-energy hammer actuation and hammer-velocity monitor; and anti-skew print-ribbon-advance arrangement, and a document transport giving controlled-deceleration with fail-safe controls.

Data communications between the host and the power encode subsystem will primarily consist of "codeline information" and encoding instructions from the host, with "disposition information" from the Encoder to the host for each document. In addition it will include sort patterns when the operator chooses to being processing a different "prime-pass pocket".

TRANSPORT

The foregoing functions will be better understood by reference to the document Transport path in FIG. 4 and to the following summary of how a document can be encoded in this HSPE module.

The HSE Module can high-speed-encode a document (e.g. within 1 minute) with the "Amount" and "transaction code" fields (16 consecutive characters). Documents to be encoded are transported in "flow mode" (assume 100 inches per second) through the DP-1 to the HS Encoder Module. Upon entry, a document is aligned, stopped at a controlled print-position, encoded, and then accelerated-out to the next module. Encoding can be done at up to 400 six-inch documents per minute (e.g. one minute to stop, encode, accelerate-out).

Magnetic Ink Character Recognition (MICR) encoding is limited to the first 16 character placements from leading edge of document as outlined in ANSI×9.13-1983 specification. Encoding is typically E13B encoding. There is no provision for manually inserting a document into the HSPE or for manually removing a document, except to clear a jam.

The encoding information must be predetermined, and then fed to the encoder for each document. Encoding is done with a Drum printer, using a MICR towel ribbon system, Encoding is "enabled" only after predetermined requirements are met, such as: proper document alignment, proper position, proper ribbon movement, and proper document spacing.

ILLUSTRATIVE RUN-THRU OF CHECK (FIG. 4)

Assume that our exemplary document ( a six-inch check) is being automatically advanced through DP-1 (FIG. 2) along a relatively conventional transport path (cf. 100 ips) from workstation DP-WS to the Encoder module (i.e. along input transport path "Td-input" in FIG. 4) The document is then thrust by slip rollers S-1 to be engaged by "first" align-slip rollers AS-1 (Note: all slip rollers S and align-slip rollers AS are assumed as PEM drives which operate to drive checks continually at 100 ips, except as otherwise specified; also assume that all sensors operate off a document's leading edge—note DP-1 uses many track-sensors TS to follow documents through the machine]. The check then passes track sensor TS-1 and, driven-on, will engage a "second" align-slip roller AS-2 (e.g. about 4" from AS-1), then pass a "first" skew sensor SS-1, to next engage a "third" align-slip roller AS-3, and then pass before a "second" skew sensor SS-2.

It will be understood that align-slip rollers A-S all operate to align the passing check, driving it down to bottom on the track-rail, and keeping it there, as known in the art. It will be understood that a regular Track Sensor operates to detect the leading-edge of the check and, after a software-controlled delay, initiate a "skew-analysis", with skew sensors SS-1, SS-2, being read-out as elaborated elsewhere. Alignment rollers AS-1, As-2, AS-3 will be seen as assuring that a check is bottom-aligned (horizontal) along the track before entering the "print-station" (along $T_d$-PS) between print drum PD and dual print-hammer bank HB.

A servo-controlled DC drive D-1, just upstream of this Print-station, will next engage the check. Drive D-1 is adapted and arranged—according to another feature hereof—to controllably-decelerate the check, and arrest it at PRINT-Position, then hold it there for encode-printing. After encoding, slip rollers S-3 (with D-1, which is reactivated) will start the check further along its path toward the next module (e.g. micro-filming, then sort-pockets), accelerating it back to "flow-mode" speed (cf. 100 ips).

Figure 6:
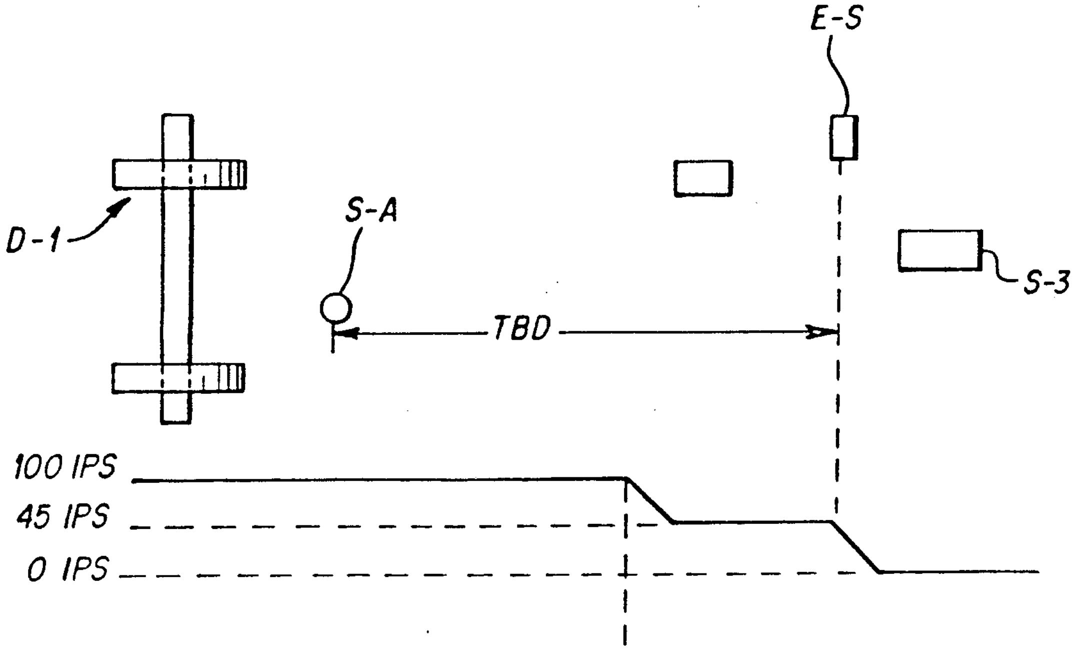
Figure 8:
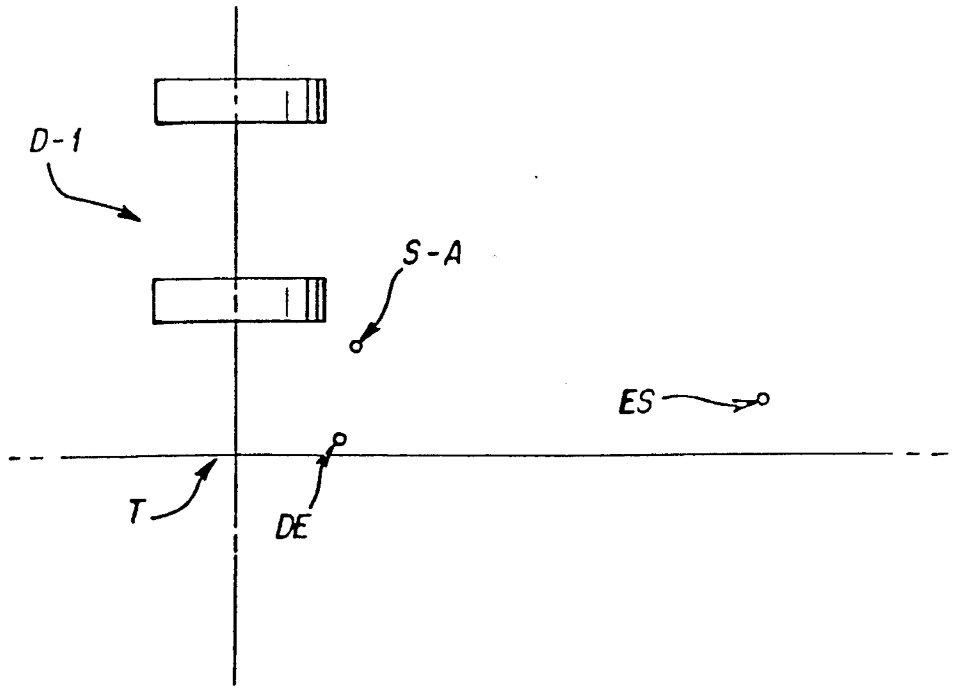
FIG. 8 is a skew sensor calibration table.

Just after engaging D-1, the check will pass Dog-ear sensor DE and Servo sensor S-A (see FIGS. 6, 8). Dog-ear sensor DE is arranged and positioned to detect whether a corner of the check is unacceptably cut-off or folded-back—in which case, the Encode program may direct that it be PASSED-ON to a Reject pocket, without being encoded. Servo Sensor S-A is—according to a feature hereof—arranged and positioned to control the further movement of the check, and, for instance, query the host computer on whether this check is to be encoded—in which case, drive D-1 is directed to controllably decelerate the check and then stop and hold it precisely at "Print-position" (as detailed below). But if the check is not to be encoded, D-1 is directed to keep it moving, at flow-speed, right through the Print-station and beyond.

Thus, workers will realize that, according to this feature, our power encoder embodiment for imprinting machine-readable characters onto documents includes a document transfer system with a document drive for moving documents along the transfer path, along with sensor devices and computer means which command this drive to controllably-decelerate, and stop, selected ones of these documents in print-position, this transfer system further including alignment-sensors to detect if the document is properly oriented, and whereby "out-of-position" documents are not stopped but are passed-through the print-station.

Beyond the HSPE module (e.g. path Td-HSPE can be about 16–17"), the check is understood to enter a microfilm module (cf. Tb-MF path—e.g. 8–9"; this module is optional), being advanced by associated aligner-slip rollers AS-4, As-5 (with track-sensor TS-2 provided for DP-1 control); then, being further advanced by slip rollers S-R and microfilm rollers MFR.

Sensor-Prism

As a feature hereof, various of these sensors (those using a source on one side of the document path, with detector on the other side) are preferably used with "optical prism" means to allow placement of source and detector on the same side of the document path.

Figure 16:
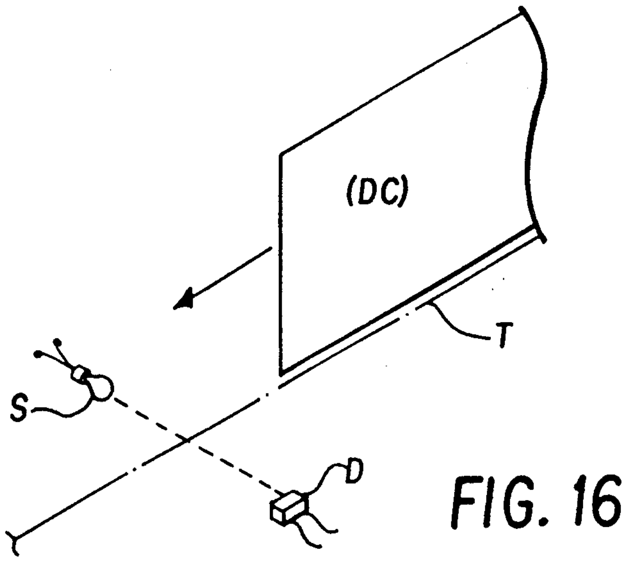
FIG. 16, in schematic perspective, depicts a typical document-sensor array.

Thus, for example, consider FIG. 16, where the transport path for document Doc is defined by the base of a Track T as indicated, with a source S (e.g. lamp) on one side of this track and an associated detector D on the other side. In some instances, as workers realize, it would be more practical, simpler, more convenient and/or more aesthetic to place source and detector on the same side of the track (e.g. the wires from D may be unsightly, and/or may interfere with operations or adjacent equipment).

Figure 17:
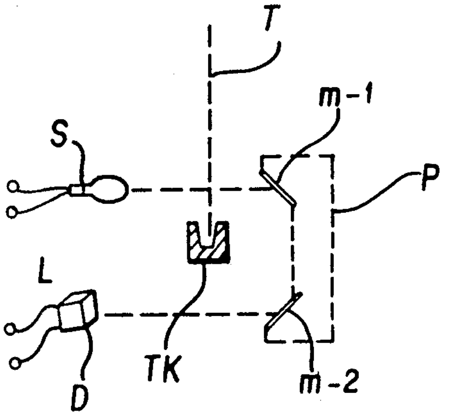
FIG. 17 shows a modification thereof in side-view.

To do this, we propose use of the mentioned prism. Thus, as indicated in FIG. 17, source S may be arranged so its beam intersects the document path as indicated along Track T, and also to illuminate a first reflector M-1 in a prism P; while detector D may be hidden away, on the same side of track T, and under the document path, being disposed to receive the beam from source S as diverted from reflector M-1 to a companion second reflector m-2 in prism P. Thus, only prism P need be mounted on the "other" side of the document path (cf. assume m-1, m-2 at 45° to beam path).

Document Positioning particulars

The HSP Encoder Module transport accepts a document in "flow mode" from the workstation, i.e. at a track speed of 100 inches per second (ips). The document positioning system aligns the document to a horizontal track level and moves it to engage the servo-controlled transport (drive D-1).

"DOCUMENT SPEED CONTROL (DSC) SYSTEM" (FIGS. 3, 4, 5)

Documents to be encoded are controlled by this DSC system in the encodermodule prior to encoding, during encoding the following encoding. The system slows and stops the document at the proper point for encoding, holds the document during encoding and accelerates the document back to full speed (100 in/sec) thereafter. The roller controlling the document during this operation is driven by a d.c. motor which has an analog tachometer nd a digital encoder for motor control. The motor shaft position, and therefore the document position, is determined from the encoder signals. The motor speed is determined from the analog tachmometer signals.

Figure 5:
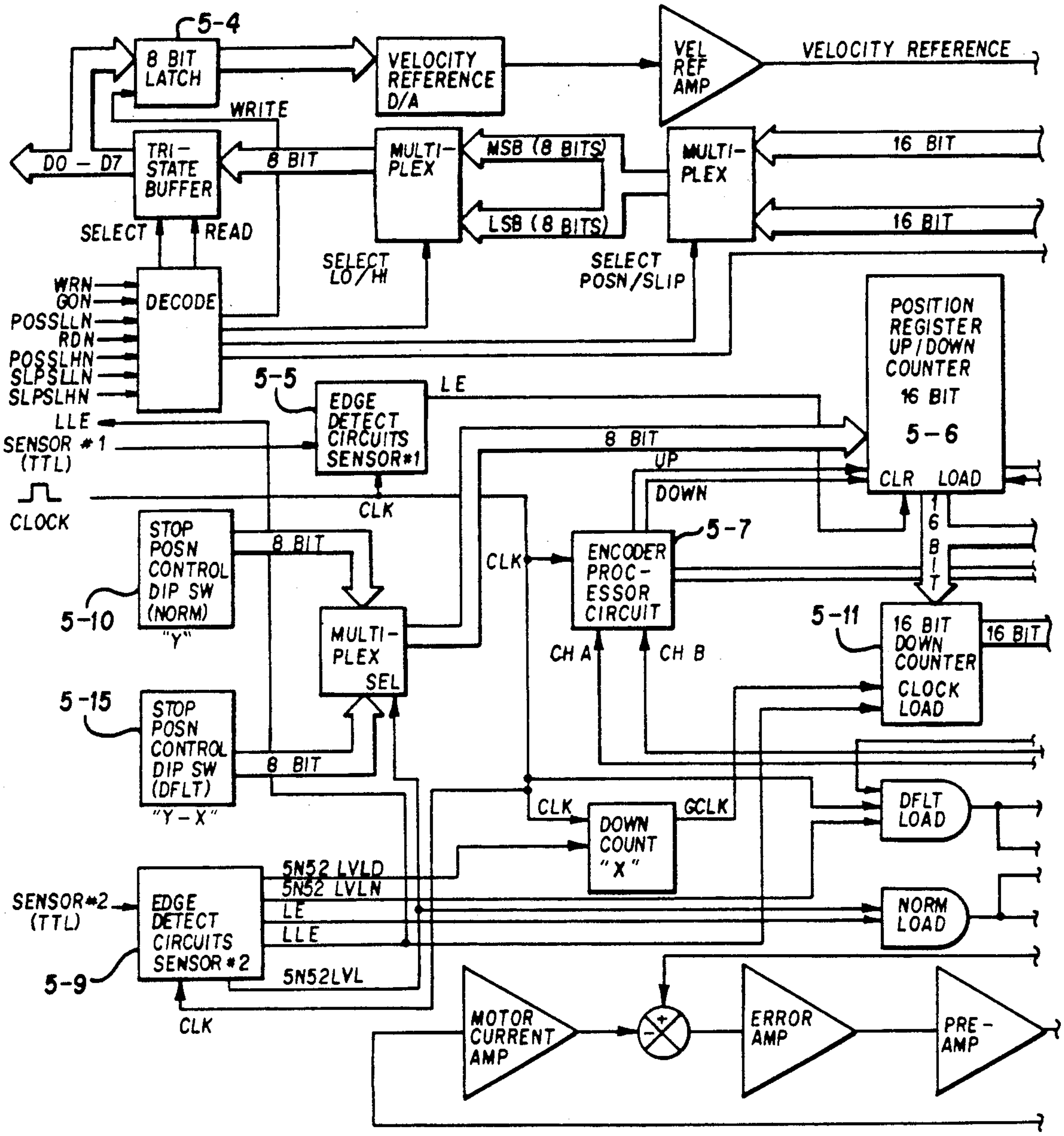
FIG. 5 is a schematic block diagram of a related document-transport control array.
Figure 5:
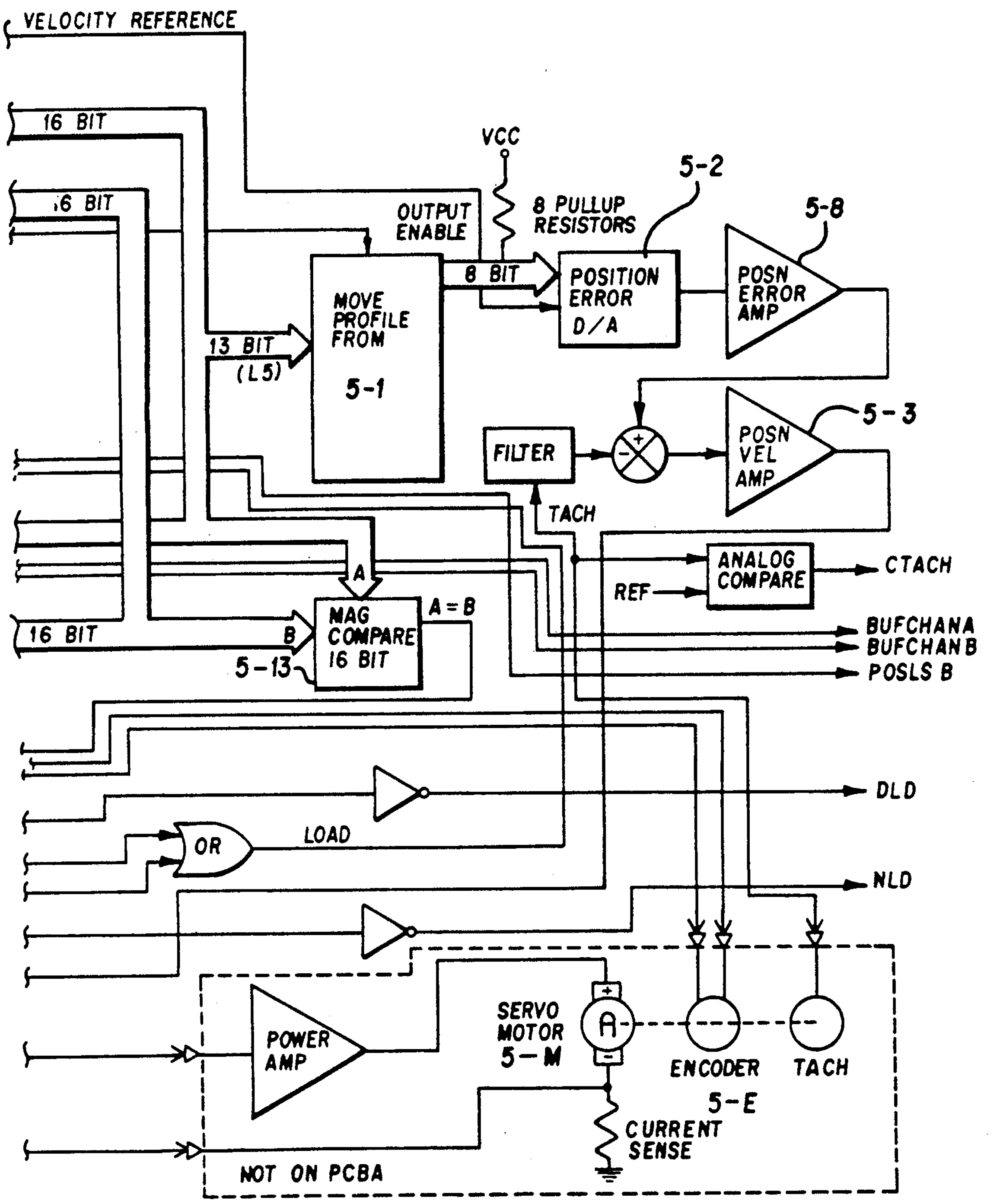

Thus, the DSC system controls a document from the moment it enters the module track (from the workstation) until it exits at the downstream end. The servo system decelerates and stops the document at a precise location for encoding, and holds the document during encoding. The servo remains stopped until the system software determines that encoding is completed; then, the system accelerates the document to 100 ips and moves it to the next downstream module. FIG. 3 shows the DSC system in block diagram form, while FIG. 4 schematically indicates the arrangement of elements and FIG. 5 shows the related electronic control system.

This DSC design ensures that the "following-document" cannot catch-up with the "current document" (reduce inter-check gap) by more than 0.75 inch while the current document is stopped for encoding, or by more than 0.3 inch when the current document is accelerated back to 100 ips. Also, in event of malfunction of Stop sensor ES, the DSC system assures that encoding will continue; while a warning is sent to the controller noting sensor failure.

DOCUMENT TRACING SENSORS (FIG. 4)

Tracking sensors TS monitor document position throughout machine DP-1, including from when it enters the HSPE module track (from the workstation) until it exits the module. Other sensors, such as "do-ear sensor" DE and "skew sensors" SS, indicate problems with document condition or alignment. These sensors report, for example, that a dog-eared document has entered the track and is not suitable for encoding. It will be understood that a sensor reports a document's position when the document"s leading edge passes. Some "tracking sensors" TS are the entrance and exit sensors (TS-1, TS-2). FIG. 4 schematically shows the general position of these, and other, sensors within the Encoder module. Tracking-sensor elevation is preferably 1.225 inches above the base of the transport track.

When the leading edge of a document trips Servo sensor S-A, this triggers (by software) a read-out of "dog ear sensor" DE. If DE is "uncovered" at this time, this indicates a "dog-ear"; i.e. that the document (lower lead-edge) has a folded or cut corner and is not suitable for encoding.

Figure 7:
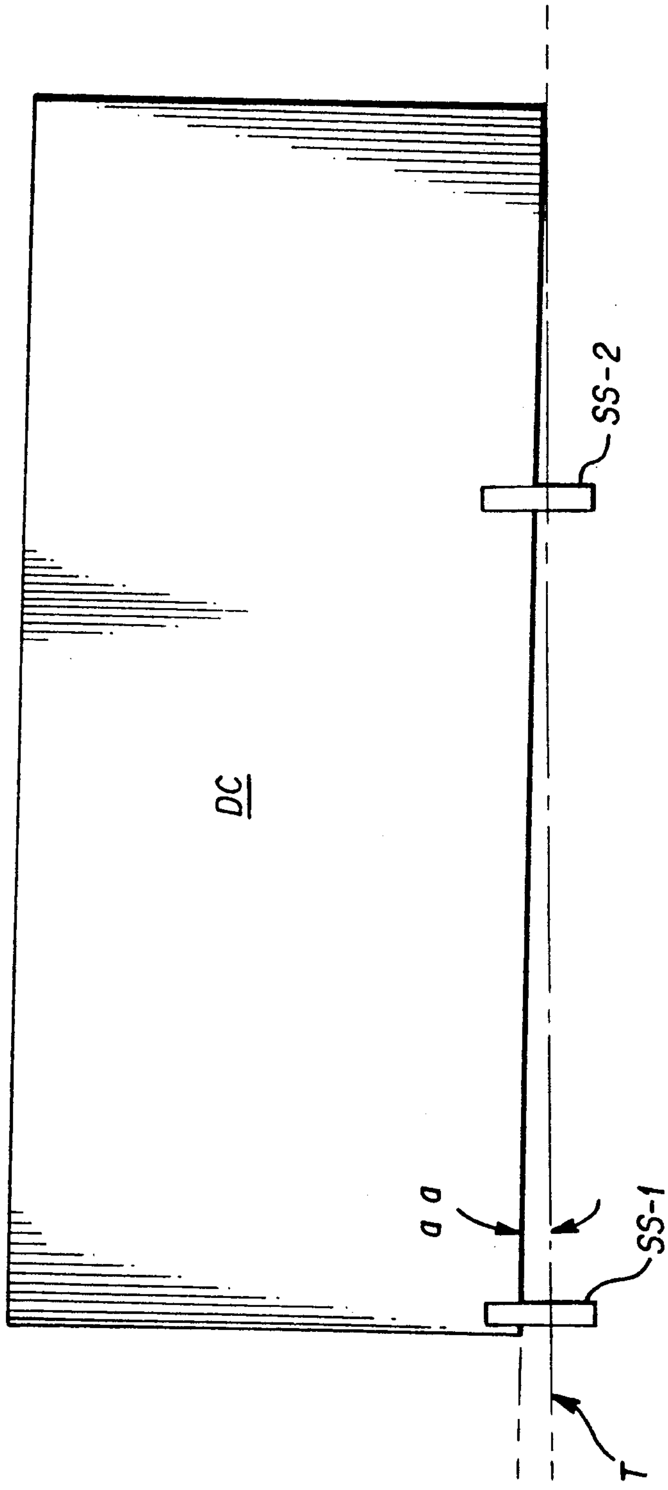
FIG. 7 is a related showing of a skew-sensor array.

"Skew sensors" SS-1, SS-2 are alike, and positioned apart, near the base of the transport track (extend up therefrom) on the upstream side of the print drum, as indicated in FIG. 4. As each document passes, the skew sensors' software determines, and reports (to computer) the amount of document "skew" (see angle aa, FIG. 7)

and its "height" (of check bottom above the track base). The reported values (skew angle, height) are then used to decide (software) whether to encode the document; that is, "skew" or "height" beyond a prescribed (program-set) degree will cause the document to be automatically "passed" to reject pocket and not encoded (details below). Advantageously, a customer engineer can readily modify these "skew" (height) parameters.

This system preferably uses two "area-sensitive" skew sensors (V-out~area uncovered; see SS-1, SS-2, FIG. 7) mounted four inches apart in the module's front track-wall, just upstream from the "print-station" (print-drum PD, hammer banks HB). The sensors are illuminated by an incandescent lamp. Sensor output current for each channel is amplified and converted from an analog voltage to a digital number which is used by the firmware program for skew analysis.

Initially, during set-up (no document present), the two sensor-amplifier gains are adjusted to obtain a standard output (e.g. sensors SS might have an active vertical detection distance of 0.2 inches above track bottom, and skew beyond 1.5° might be designated "excessive").

In normal operation, the system measures the voltage output from each sensor-channel when a document is presented in front of the skew sensors SS-1, SS-2, and obtains a difference, if any, (ΔV~skew°). The document skew angle aa° is then determined using standard trigonometric formulas. [TAN aa=(height2-−height1)/4]. Document height is determined as the average value for the two sensors, i.e. (height1-+height2)/2.

"Servo sensor" S-A reports tot he servo system when the leading-edge of a document arrives (beyond D-1) in time to initiate "STOP" command and decelerate the document. Preferably, at set-up, when a test-document is run past S-A, it is timed until it passes stop-sensor ES and beyond, until reaches "print-position" (stopped). The software will direct and register these timings (e.g. via system-clock, registering x "clicks" to ES; x+s clicks to print-position). Then, when a document trips stop sensor ES, its output may be compared with this (x clicks in memory—to verify); this also may be used to enable a stop-switching arrangement (see below—-whereby a Customer Engineer may set switches to adjust "stopping-distance" $d_s$ after ES is enabled; then, as an alternative to the above-mentioned servo-sensor control, the document will be controlled to be stopped ss inches—s clicks of clock—after tripping ES.) Software then initiates a "print" operation if all other (sensor etc.) reports are favorable.

Thus, at a predetermined distance from servo sensor S-A, the software directs servo-positioning drive D-1 to decelerate the document from 100 ips to 45 ips (see profile, FIG. 6). Next, when the document's lead edge trips stop sensor ES, software sends the servo positioning device a "stop-distance-value" ("s-d"). This distance would typically represent a document (lead-edge) position of 0.100 inches beyond stop sensor ES. The servo positioner D-1 then further decelerates the document from 45 ips to a stopped position, in exactly that distance s-d (FIGS. 6, 8). At that time, if all reports are "positive" (skew, dog ear and stop position), software initiates a "print" command, and encoding proceeds, D-1 holding the check stationary.

Sensor Compensation Technique

A "Sensor/PWR" PWBA (circuit board) contains LED current registers which set LED current for "compensating" the output of five sensors: i.e. entrance TS-1, servo S-A, dog ear DE, stop ES, and exit sensor TS-2. Each sensor will be understood to preferably comprise an LED diode and a corresponding phototransistor. LED current can be set to one of 16 values, with minimum current corresponding to a zero in the LED register; while "15" in the LED register corresponds to maximum current.

"Compensation" is accomplished by setting the LED current value just one step higher than the "minimum-conduction current" for the photo-transistor. The object is to adjust sensor sensitivity to compensate for aging or dirt effects. Compensation is done only upon machine-command (by DP-1). Results of the compensation are reported to DP-1 via the common controller.

More particularly, a sensor is "compensated" as follows: starting with minimum LED current, one adds single increments of current until the sensor appears "uncovered"; then adding one additional current unit for "margin". During the compensation routine, a check of proper operation and results is carried-out, with results reported to the host.

The Sensor/PWR board also contains phototransistor amplifiers and registers for reading the transport sensor outputs and the state of the cover interlock and printer module position switches. The transport ON/-OFF and the interlock control logic are also on the PWBA.

PROGRAM for DOCUMENT-HANDLING (FIG. 4, 5)

Refer to the DOCUMENT SPEED/POSITION CONTROL system block diagram in FIG. 5 for the following discussion. During normal document flow, without encoding, the servo motor S-M is kept at a fixed velocity that causes documents to move at 100 in/sec. Signal GON is hold low by the controller PWBA in this mode. This disables the MOVE PROFILE PROM 5-1, causing code 'FF' to be supplied to the POSITION ERROR D/A 5-2 (pullup resistors cause 'true' levels on prom outputs, which are in hi-Z state). The code 'FF' (means 100 ips; code "7E"−45 ips; code 20-0 ips) supplied to the DAC causes a fixed voltage to be generated by the POSN ERROR AMP 5-8. This voltage is compared to the motor TACH feedback voltage to generate an error signal, which is amplified by the POSN VEL AMP 5-3. Under these conditions the motor will accelerate to the 100 in/sec speed point and continue to run at 100 ips—the servo is now in VELOCITY mode (S-M drives D-1, of course).

The firmware (program instructions permanently loaded into a control memory; e.g. typically a ROM of the central processor) adjusts for VELOCITY REFERENCE on "power-up", to compensate for a 5% tolerance on the (analog) tach. To make this adjustment, the firmware holds GON low and writes a reference code to the 8 BIT LATCH, using selected line POSSLIN, and write line WPN. It then analyzes the signal BUFCHANA, which is a buffered version of ENCODER CH A output. If the frequency of the signal is less than 31.83 KHZ, the firmware will load a new 8-bit code that increases the Velocity Reference, thus speeding up the motor S-M. The process continues until the frequency is correct within ±0.1%, insuring that document velocity, when controlled by servo roller D-1 in this mode, will be precisely 100 in/sec.

Encoding

When a document is to be encoded, the servo system will cause the document to follow to profile shown in FIG. 6; thus when the document encounters servo sensor S-A, the EDGE DETECT CIRCUITS SENSOR #1 5-5 will detect the leading edge of the sensor output, generating signal LE. This signal clears the 16 bit POSITION REGISTER UP/DOWN COUNTER 5-6. The ENCODER PROCESSOR CIRCUIT 5-7 is always generating UP or DOWN counts from the ENCODER 5-E when the servo motor S-M is moving. DOWN counts are generated for downstream document movement, and UP counts are generated, if upstream movement occurs (meainly on STOP if there is an overshoot). Thus, following CLEAR at the servo sensor point, the POSITION REGISTER UP/DOWN COUNTER 5-6 will decrement to FFFF on the first DOWN count and continue to count down as the document moves. Each count represents 0.785 milli-inches of movement.

Also, when the system controller (Host μP) received a "check-coming" signal from servo-sensor S-A, the firmware will, now, drive GON top go true—but only if the document is to be encoded. It may be noted—as a feature hereof—that timing, here, is not critical, since the hardware is keeping track of document position, following the triggering of SENSOR S-A. The POSITION REGISTER UP/DOWN COUNTER 5-6 addresses the MOVE PROFILE PROM 5-1 (FIG. 5).

For the first several inches of document beyond SENSOR S-A, the Prom output code is 'FF' (PROM is enabled, since GON is true). The exact time that GON goes true is not critical, since the output code was, originally, effectively FF tri-state), so the velocity remains a 100 in/sec. After approximately 3 inches of document displacement beyond SENSOR S-A, the PROM code switches to '7E', (see velocity PROFILE, FIG. 6) which represents 45 in/sec.

The document will rapidly decelerate to this speed and continue at this speed until STOP SENSOR ES is encountered. The EDGE DETECT CIRCUITS SENSOR #2 (5-9) will detect the leading edge LE and the level of its output (signal SNS2LVL). these two signals are 'anded' to generate a LOAD pulse, which causes the lower eight bits of the POSITION REGISTER UP/DOWN COUNTER 5-6 to be loaded with the code determined by the STOP POSN CONTROL DIP SW (NORM) 5-10. This effectively "jumps" the counter to a point which is 100 mils upstream of the STOP point.

The STOP point is set to be the point at which the output of POSN ERROR AMP 5-8 is zero. The servo system will decelerate to this point and stop, with the motor (D-1) holding the document at this point. The servo system is now in POSITION MODE. This occurs due tot he code generated by the PRM. After the PROM address has jumped to the point 100 mils above the STOP point, the PROM outputs increment and decrement on a 1:1 basis with the lower eight bits of the POSITION REGISTER UP/DOWN COUNTER 5-6, therefore effectively making the PROM "transparent" in this zone and causing the servo to function as a normal position servo.

The servo will remain "latched" at the STOP point until the firmware was determined that the printing is finished; it will then cause GON to go false, causing the servo to return to the 100 in/sec velocity mode. The above is NORMAL MODE operation.

"DEFAULT MODE"

A DEFAULT mode (LEARN MODE) is also preferably incorporated, such that, if servo SENSOR S-A "fails" (e.g. becomes too dirty) during normal operation, encoding may continue, while at the same time a warning is issued to the controller (Host) that SENSOR S-A has "failed". The system is initially set-up to count clock-pulses from "document-entry" until STOP (e.g. 0.10" beyond Stop SENSOR ES) and to store this count to use in emergencies (e.g. if STOP Sensor ES fails).

In "NORMAL" MODE operation, signal LLE loads the 16-BIT DOWN COUNTER 5-11 (FIG. 5) with the POSITION REGISTER code at the leading edge of SENSOR #S-A, and just prior to the LE signal (which normally jumps the POSITION REGISTER 5-6 to its address 100 mils above the STOP point). The GCLK rapidly counts-down the 16 BIT DOWN COUNTER 5-11 at a rapid rate (total of 16 counts). With this count complete, the 16 BIT DOWN COUNTER is "frozen" at a value of "16" (or 0.785, i.e. 4.71 mils below the POSITION REGISTER count when the document has reached SENSOR S-A). In NORMAL MODE operation, the POSITION REGISTER 5-6 will never reach this value, since it is immediately "jumped" to a much lower number.

However, if SENSOR S-A becomes defective, the jump will not occur and the POSITION REGISTER will continue to downcount. When the document has moved 4.71 mils beyond the normal trigger point of Sensor S-A, the MAG COMPARE 16 BIT circuit 5-13 will generate signal "A-B". This will generate LOAD and DLD. The LOAD signal will now cause the code from the STOP POSN CONTROL DIP SW (DFLT) 5-15 to be loaded into the POSITION REGISTER. These switches are set 16 counts below those of the STOP POSN CONTROL DIP SW (DFLT) 5-15 to be loaded into the POSITION REGISTER. These switches are set 16 counts below those of the STOP POSN CONTROL DIP SW (NORM) 5-10.

This allows the servo to "make up" the lost 4.71 mils, thus topping in exactly the same place as in NORMAL MODE operation. The DLD signal is supplied to the controller PWBA, indicating to the firmware program that the system is now operating in DEFAULT MODE. Operation continues in this mode while encoding proceeds. The 16 BIT DOWN COUNTER 5-11 will remain frozen at the last valid count determined when SENSOR S-A was still operational.

There is also a SLIP DETECTION sub-system wherein firmware reads the POSITION REGISTER count at SENSOR S-A (leading edge), using SLPSLIN, SLPSLHN, RDN signals, and compare this against a number which has been stored in NVRAM. The stored number represents the count which would occur for a normal "non-slipping" document, and is determined using an MTR program.

SLIP DETECTION is not operational in the DEFAULT MODE, since there is no SENSOR S-A signal. The firmware recognizes that, since DLD is occurring, it cannot check for "slip".

The nominal document-speed profile for stopping documents to be encoded is shown in FIG. 6. The "dwell distance," at a speed of 45 in/sec, can vary (e.g. from 0.2672 inches to zero, since the position of servo sensor S-A will vary from machine to machine).

"REST time" (i.e. time at rest for encoding) is determined by encoder printer requirements.

The speed profile (FIG. 6) is designed so that, in the worst case, the "following-document" will not catch up by more than 0.75 inches during "REST time"; also, it will not catch up by more than 0.3 inches during the acceleration of the encoded document back to 100 in/sec. Remaining catchup time is determined by how long the document must be held at rest for encoding.

PRINT STATION

As mentioned, the subject encoder embodiment arrests each document (and the print ribbon) during imprinting. High-speed imprinting (e.g. MICR-encoding) is done with a continuously-rotating print drum, with each document (check) arrested momentarily for encoding (one row) by its transport (e.g. see FIG. 4). This improves the quality of the printed image and discourages blurring. The drum is "full-populated", with six (6) duplicate sets (sectors) of character dies disposed about its periphery—these in 16 columns (each column can print in one character-position on the check, with numerals 0–9 arrayed sequentially along a column (thus 10 rows) for each sector (see FIG. 10). The character-columns will be noted as "skewed". With intermittent print-ribbon movement carefully-controlled, ink-depletion is minimized.

The Print-drum will thus be understood to present six sets of 16 characters to power-encode (print) a MICR Courtesy Amount C-A (e.g. 12 symbols) on a check after prior processing of the check by an imaging system (sending MICR data to host, and electronic-image data to a special storage module; e.g. see FIGS. 10, 12, 15, 13). The machine, and/or an operator will have entered the C-A data into the associated host computer—this C-A data to be thereafter encoded on the check by our subject "high speed power encoder", which will then route the check to a machine-determined sort-pocket.

Figure 9:
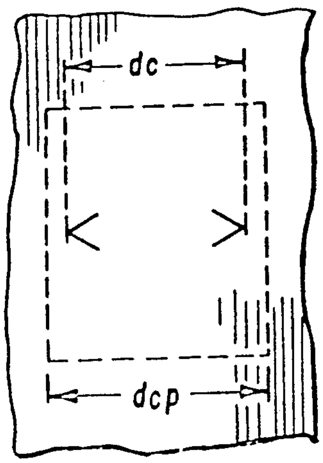
FIG. 9 tabulates the specifications of a Print Drum apt for use with the invention.

A preferred embodiment is capable of imprinting sixteen characters (the maximum used in today's banking) within 40 milliseconds (typically 33.3 ms—see FIG. 9). An additional 20 milliseconds is used in each line-print cycle to decelerate the document from 100 inches per second to a complete stop; and it takes 6 ms to accelerate back to 100 ips. The system can so encode 400 documents per minute.

Cantilever mount

Not (FIG. 13) that our Print-Drum PD (and ribbon-driving rollers etc.) are journaled in their housing only on one side, i.e. are "catilevered". This reduces cost because only one "housing-casting" is required; it also allows ribbons to be slipped on and off easily, as opposed to dismounting a roller journaled on two sides. This "cantilever mounting" (rather than mounting on an axle fixed at both ends;) affords better serviceability, easier ribbon-loading and easier drum-change (e.g. when print-drum is changed to change the character font). And, Print-Drums for the various character sets can be provided with means on each drum for generating unique magnetic indentifier-signals to identify the font and thus prevent inadvertent encoding of the wrong type of characters.

PRINTER OVERVIEW

The subject high-speed impact printing uses total transfer E13B MICR (or OCR etc.) ink formulations. The print station is a single unit with a fixed hammer-to-drum relationship. Charactersignals and Index timing signal means will be understood as etched on the drum to permit hammer-to-drum synchronization.

The six identical sets of 10 row sectors on drum PD (only one set shown in FIG. 10, which shows a typical sector) are designed so that any possible code line can be printed, usually, within ten consecutive rows. [note numerals 0–9 plus "Amount symbol" A].

The arrangement of each 10-row sector allows the encoder to print any possible code line within 10 consecutive rows of the drum, usually, FIG. 10, illustrating one set of 10 rows, has amount symbol "A" placed in column positions 1 and 12 (odd, even hammer bank) in all sets on the drum.

Two sets of "timing means" (marks) are etched on the print drum; one set (60) to give 60 row- (or character-) pulses; the other to give six index-(sector) pulses. All but one of the "index pulses" are arranged so each falls exactly between two "character pulses. " The sixth "index pulse" is offset (closer to one row pulse than the other) in order to distinguish between drum-types.

Our encoder embodiment preferably includes "index means" to correct the "system clock" which commands the print-hammers to "GO" (start flight toward drum). This "index means" comprises a magnetic pick-up located adjacent the print drum and adapted to respond the "index marks" on the drum.

Preferably, these "index marks" also serve to create an identification signal (via the magnetic pick-up), that is unique to a font type; to so identify the type of machine-readable characters (font) to be imprinted by that drum (e.g. MICR type; European font).

Timing electronics for the print drum is located on a Skew Sensor Amplifier card. This card primarily consists of the circuitry required for a Skew Detect system (details below). Magnetic transducers are used to detect the drum pulses. The analog signal output from the transducers is amplified and converted to a digital signal, which is used by the microprocessor board.

This sixteen-column impact drum printer is capable of imprinting 400 six-inch documents per minute. [Note: documents contemplated will be 4.5–9.25" long × 2.75"–4.25" high]. Columns 1 and 12 print only amount symbols A (one even column, one odd—corresponding to Even/odd hammer banks). Columns 2 through 11 and 13 through 16 can print 0 through 9 numerics in E13B font. "European" (13-column) printing is an option.

"Alignment Character" ("< >"; or ⌊⌉)

A possible problem is "uneven strike" of a hammer—e.g. comprising the legibility or MICR-readability of the affected character so printed. When a hammer strikes, its face may hit the selected drum-die "offcenter" i.e. to the right or left, or above or below (vs a flush, even, hit where the hammer face hits the die type squarely). We have developed a kind of "test character" ("alignment character") for testing hammer-face alignment relative to the dies. This test character is preferably placed on one sector of the drum with the type characters (cf. FIG. 11, only row #1, only columns #1, #12); and preferably looks like "< >" (see on FIG. 11, with "< >" substituted for "A" in FIG. 10; only in one sector]. It could also be a grid, or "o" or an "oppositing-angles" test character (e.g. ⌊⌉ ). Hammer impact on such a "test character" allows one to see whether a hammer (one from each (ODD/EVEN) hammer-bank)

impacts squarely. When it does not, the position of its hammer-bank relative to the Drum can be adjusted (preferably, drum PD is shifted, with hammer banks HB kept fixed).

An uneven strike can develop excess pressure, i.e. if the hammer hits one side harder, "debossing" can result—this buries ink in the paper and makes it hard for a MICR-Reader to sense it. Our special test symbol (e.g. "<>") is formed and placed to be "close-to-spanning" the entire width and height of any hammer (FIG. 11A). Thus, to get legible printing of our entire "test character", a hammer must hit it very squarely.

FIG. 11A schematically illustrates one full "character-space" (die position) on drum PD (cf FIG. 10 or 11), being of prescribed full-width "dcp" and height as known in the art. As workers are aware, a minimum margin must be maintained on all sides; e.g. if a die is too close to a die, it may cause "ghosting": a light printing in an adjacent character-space. Thus, our special ∫alignment character" (e.g. "<>", as in FIG. 11-A) will respect this margin (cf. inner width "dc" in FIG. 11A).

As mentioned, the embodiment also includes control means to signal when a document is stopped "in-alignment" and is thus ready for imprinting (see above); along with control means to selectively adjust each print-hammer (flight time) so it will impact the document with relatively constant print-pressure (when a selected die, on the rotating drum, comes into position).

Printer electronics is provided by two printed-circuit boards, with hammer drivers packaged on one board, and the microprocessor, ribbon control, sensor and interlock circuits on the other board.

The high-speed Printer is preferably controlled by an 8-bit microprocessor; communications with the host CPU will be transmitted through a parallel interface working with a parallel handshaking protocol.

Hammers

This HSP encoder embodiment will be understood to also include two banks of like electro-magnetically-operated print-hammers, positioned so that, when a document-to-be-imprinted is stopped at the print station facing drum PD, the print-hammers can properly strike the document. A hammer presses the document against an associated, interposed, ink-coated print-ribbon—the hammer-strike timed (as known in the art) to press the ribbon against a selected one of the raised dies on the drum and thereby imprint the document-column (see hammer banks HB, ribbon R in FIGS. 12, 15, 13, 14).

The hammer banks used in this embodiment consist of four hammer modules (four hammers each), a hammer magnet assembly, two electronic circuit cards, a microprocessor card and an analog hammer-drive card. The hammer magnet assembly consists of two banks of nine individual magnets, each mounted on a hammer bank casting. The hammer banks HB-1, HB-2 comprise two inter-leaved (ODD/EVEN) sets of hammers as known in the art.

HAMMER DRIVE ELECTRONICS

The Analog card is a "current sink" for the sixteen hammer coils. Under control of the microprocessor, the Analog card energizes a hammer coil and sets the level and width of its current pulse. Eight dual hammer pre-driver ICs (each controls two hammers) are used to set hammer current level and pulse width.

This card also has flight time monitoring circuits and high voltage D.C. control.

Hammer current amplitude is adjusted by setting its voltage level Vc1, as an analog input common to each hammer pre-drive. Hammer current is routed through a (one ohm) sense resistor, whose output voltage is fed back to the respective pre-driver chip and compared against Vc1. The pre-driver chip controls a "Darlington" drive transistor, operating in "constant current" mode. The pre-driver chip increases. The drive on the output transistor until the voltage fed-back from the sense resistor equals Vc1. [Vc1 is derived on the Analog board via a precision voltage regulator. ]

A successful print operation requires precise synchronization between drum motion (character phasing) and hammer flight. For example, a hammer moves at approximately 100 ips and must squarely strike its die-character while the drum is continually moving at 51.6 ips. Therefore, drum to hammer synchronization is critical. Proper drum-to-hammer timing is maintained through procedures for: "Hammer Flight Timing" and "Character Phasing".

To adjust Hammer Flight-time, all hammers can be set so they "fly" for a specified $T_f$ time before impact. This flight time can be controlled by adjusting the "start-position" of a hammer, as known in the art or it can be controlled by our preferred technique (see below).

"Character Phasing" determines the time-out (delay) that the microprocessor must introduce (i.e. delay after receiving a clock pulse from the character row detector) before firing a hammer. The phase delay is varied two ways: through hardware (Coarse adjust) and through software (Fine adjust). "Coarse adjust " is effected by changing the position of the character row magnetic pickup. "Fine adjust" is effected by changing the delay-time through software. This software delay is stored in non-volatile RAM so that times need be calculated only once.

Adjust hammer start-position

Our encoder embodiment can include "calibration means" to selectively adjust the "at-rest" position of each print-hammer (i.e. shift it closer to drum, of farther away) such that its "flight-time" (from when a hammer receives its Go-signal until it contacts the document) is maintained within a prescribed range—to yield accurate imprinting, with characters aligned along a row. Preferably, this flight-time interval is detected according to a characteristic voltage-shift in a hammer's Drive-circuit (e.g. see FIG. 19, see "start" and "impact" points, with voltage cusp $\Delta V_c$ characteristically occurring in precise time-relation with hammer-impact).

"Cosntat-GAP/variable-Energy" Hammer Drive system

Figure 19:
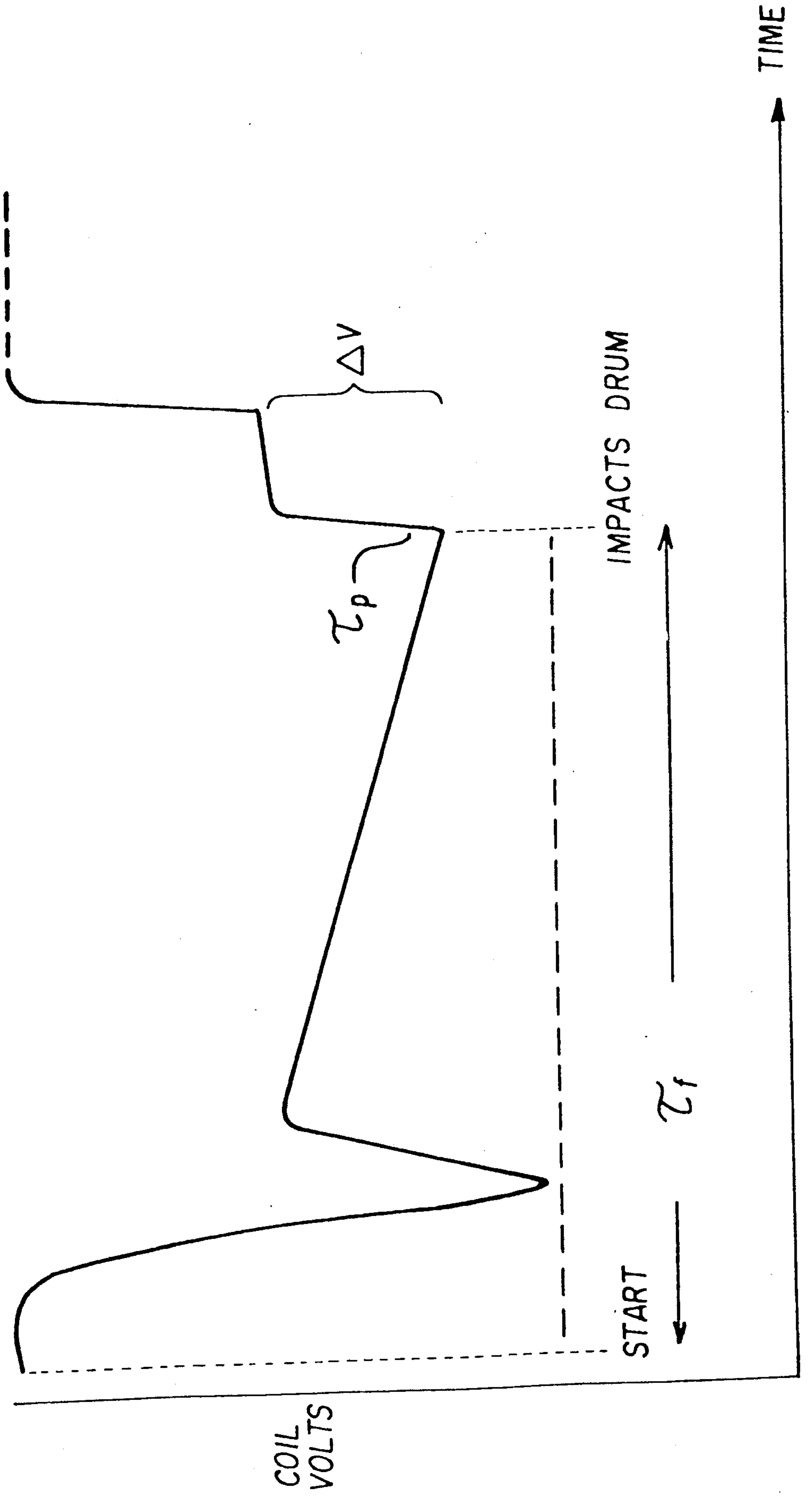
FIG. 19 is a plot of typical hammer-voltage vs time.

A preferred alternative to the above-mentioned "adjustable-gap" technique for synchronizing print-hammers—and a feature hereof—is a system where hammer-gap is kept constant (no adjustment of start-point), but flight is adjusted int he following fashion:

1—Drive-Energy (coil current phase) can be adjusted for each hammer-coil to yield simultaneous drum-arrival (arrival can be sensed via pickup on drum for each row; as workers know);

But a coil-voltage curve as in FIG. 19 can also sense this. That is, the voltage (source Transistor) for any given hammer coil may be represented, idealized, as in FIG. 19, where voltage may be expected to "jump-up" (see cusp) at a point, in each cycle, close to, or coincident with, hammer-impact ("arrival" at drum). Thus, a circuit that monitors each hammer's coil-voltage and detects this cusp ΔV, can also indicate arrival-time (as well as "flight-time" $T_f$, also drum run-out; and even whether the hammer coil ever received a proper current pulse).

2—Each oil-fire time (phase) is Fine-tuned until all printed characters (e.g. test symbol) look as alike as possible;

3—As necessary, coil-current value (fire-time) is adjusted to correspond with symbol-area (e.g. the microprocessor will store four values of symbol-area, according to the amount of raised impact-area on the "selected" die—e.g. symbol "7" may be least area (in squ. inches), then "2" etc. with "8" on the high side; now, four corresponding coil-current levels are also set up: e.g. 100% i; 84%, 67% and 50%, with 50% i assigned to "min.-area" for symbols like "7" and 100% i to "Max.-area" symbols like "8" etc.)

Note: Workers realize that, for a constant-energy drive, a "Max.-area" symbol like "8" might print "Light" whereas a "Min.area" symbol like "7" might be "buried" in the paper ("debossed")—and a MICR head could find it difficult or impossible to read such a "buried" or "light" symbol (and MICR-ink might also be splattered, adding problems). Thus, strike-pressure (force/area) should, preferably, be normalized, for all die symbols. This feature aims to do this.

3A—To do this, an 8-bit "signature-code" is stored in (RAM) computer memory (μP) indicating a 100%-current value assigned for each hammer (hammer-tailored).

Then, this 100% value may be "de-rated" (to 50%, 67%, 84%) by the μP according to the "area value" of the called-for symbol (e.g. the "Min.area" symbols get only 50%, the Max. area symbols get 100%, etc.)—this being done, each print-cycle, with two added "bits" (4 levels via: 00, 01, 10, 11, as workers realize)—whereby a total of 32 bits may be assigned to coil-current for each hammer, in each cycle.

4—Also, we prefer to vary fire-time with energy-level; i.e. we find that reduced hammer-current, as above, will give a "late" hit; thus firing-time must be advanced (e.g. by μP).

5—Further, we prefer to also vary current-pulse-width with energy-level (also by μP).

6—The foregoing adjustments will be understood as co-ordinated to assure simultaneous hammer-arrival plus fairly-normalized impact-pressure with each hammer.

A preferred "set-up" for such a "constant-gap/variable-energy" technique is now discussed.

SET-UP

With this set-up, it will be understood that—all hammers are set at the same "hammer-to-drum" gap and that a prescribed "flight-time" for all hammers (for a given energy level) is obtained by adjusting hammer current drive level (rather than hammer-to-drum gap). This results in various advantages, including a truly "constant-energy" system (same pressure for all dies) and elimination of the risk of a hammer protruding into the document flow path due to a "small" hammer-to-drum gap adjustment. A description of how our hammer drive may preferably be set-up is now given.

The current level for driving a given hammer is determined by an eight-bit code that is loaded into an eight-bit latch by a special program. This program fires the hammers one at a time and adjusts current level until the desired "flight time" is achieved. The program then stores this 8-bit code for further used by the system during encoding. The discussion will now refer exemplarily to the operation of channel #1.

The program will set lines ADDR0, ADDR1, and ADDR2 to logic level "0" in order to select the first channel. It will then place a desired 8-bit code on the PTRBD0-PTRBD7 bus for loading into latch U54. It then placed s "0" on line SELCURLIN and issues a negative active WRTN pulse. This places the desired code into the U54 latch. The latch 8 bit output drives the input address lines of an 8 bit digital to analog converter U31, which supplies a current proportional to the code to amplifier U41-13. The amplifier supplies a positive voltage signal VCL1 to hammer pre-driver chip U15. The digital to analog converter output is also modified by its VREF+ input, depending on the desired energy level (see below).

A hammer pre-driver chip operates in "current control" mode; to drive transistor Q38, which, in turn drives the hammer coil. Coil current flows through resistor R2, and its voltage drop is compared to VCL1. The pre-driver chip regulates this voltage to be equal to VCL1, thus controlling the current to the desired level. This pre-driver chip is active due to its selection by negative active signals X1, Y1 from the control program and due to receiving signal HMFIRE1N, which initiates hammer drive.

Hammer drive pulse width is determined by the frequency of signal HMCLK1N. The pre-driver chip counts 128 of these pulses and then terminates the hammer drive. Signal IMPACT1 is supplied to a differentiating circuit comprised of Q25, U2 and Q5. This circuit supplies a pulse to the microprocessor controller for flight time measurement, which pulse will coincide with hammer impact.

The above describes operation for a single energy level. To vary energy level for each hammer, the program supplies 2 bytes of data to latches U55 and U56. Bus EN(0:15) directs bits 0.1 to analog selector switch U78. This switch will select one of 4 current references for digital to analog converter U31. This will allow VCL1 to be one of 4 levels, depending on the energy level desired by the program. These 2 bytes of data are supplied to the circuits for every document to be encoded. The content of the bytes is determined by the character to be printed by each hammer.

The "Multiple Energy" system also requires that hammer fire-timing be different for each energy level, i.e. lower hammer energy requires earlier firing. The microprocessor under program control supplies signals HMFIREAN, HMFIREBN, HMFIRECN and HMFIREDN to PALS U71 and U72. The PALS also receive the energy but information EN(0:15). The PALS will select the proper hammer fire pulse for a given hammer and character using this bus information (e.g. the U72 PAL supplies HMFIRE1N pulse to U15).

A further requirement is that current pulse width varies for different energy levels. It is expected that 2 pulse widths will be sufficient for the 4 energy levels. Signals HMCLKA and HMCLKB are generated by the circuits for use in the "pulse width variation system". These signals are at slightly different frequencies corresponding to the 2 desired pulse widths. These signals are also supplied to the PALS. Thus, the U72 PAL supplies the proper HMCLK1N pulse to pre-driver U15 for the desired pulse width for a given hammer and character as determined by the EN(0:15) bus.

SYSTEM TEST

The above system will allow for testing encoding characteristics at four (4) energy levels. The relative energy levels can be changed by a different selection of analog switch resistors. The relative hammer "fire times" can be changed by changing the microprocessor program.

Hammer current pulse width is defined by the width of 128 clock pulses of "HM_CLK", a digital clock signal common to each of the pre-drivers. HM_CLK is a free running clock signal derived on the Analog card using an oscillator and a frequency divider. "Hammer flight time" is monitored with differentiating circuits on the Analog card. To determine flight time, the circuits detect the mentioned hammer-coil "voltage-jump" (V, FIG. 19) associated with the point (time) of hammer-impact.

There are 17 "flight-time-circuits" on this Analog card, one for each of the 16 columns with one common circuit. The 16 individual circuits are used for "on-line" detection of "flight-time"; the common circuit is used for setting hammer flight times in "Maintenance" mode. The Analog card can disable +48 volt power through a digital output signal, HSVP_SUP. this +48 volt power is disabled if, when not printing, current flow is detected in any hammer.

The Microprocessor board controls the hammers via a nine-bit control bus. Eight bits form a 4×4 matrix which is used to select which columns to fire. The ninth bit is the hammer strobe pulse. To fire a hammer, the microprocessor board selects (in order) the hammers to be fired for a particular row. After timing-out for phasing, the hammers are strobed to initiate the fire sequence. Current is applied to the hammers for a prescribed time period, defined by circuitry on the Analog card.

Ribbon System

The print-ribbon R may be deployed/advanced as indicated in FIGS. 12, 15, -13, -14, shown in operating position. The entire HSPE module will lift-up with minimal effort for servicing and ribbon loading. Ribbon is loaded from the open side of the (cantilevered) drum assembly, when the module is in "service position".

Print ribbon R is friction-driven by polyurethane-coated drive roll DR (engaged vs the mylar backing MB of the ribbon). Ribbon R is dispensed from a supply roll SR and is held (normally) thrust against drive roll DR by frictional drag means FD on the upstream side and by a pair of like, balanced, spring-loaded pinch-rolls PR, PR' on its downstream side (see FIG. 14, SP for PR, SP' for PR'). ribbon R wraps around an idler roll IR mounted to rotate on a fixed shaft Sh. Shaft Sh also serves as the pivot for pinch roll pair PR, PR'. Tension is applied to ribbon R as it leaves idler roll IR by a ribbon take-up spool TUR, coupled to be rotated by an associated motor M-2.

The Ribbon is advanced "step-wise" at the completion of each print cycle. That is, after a document has been fully-imprinted, motor-driven drive roller DR (FIG. 14) will advance ribbon R one "full step" for the next print cycle. DR is so rotated by a gear motor DM and belt coupling DB. Motor DM is preferably firmware-controlled to so step ribbon R.

The ribbon wraps 180° around the urethane capstan and is held against roller DR by pinch rollers PR, PR' (e.g. typically exerting a 43.6 oz. force on the ribbon via springs SP, SP'). Each pinch roller is independently loaded and provides the same pinch-force, normally.

Just below the print station is a ribbon guide RG (FIG. 12) containing four (4) edge-detector units (PS, PS', PPS, PPS'). The detectors are optical and apertured (0.025"×0.045"). Guide RG may comprise moldedpolysulfone plastic. The uninked side of ribbon R rides against the detector side of guide RG and the detectors are located under the ribbon. This forestalls build-up of paper dust on the detectors. The first detect set PS, PS' (FIG. 20) is located 0.030" inside each ribbon edge and function to detect "minor" ribbon movement (or "wander"). The second set of detectors PPS, PPS' is located 0.090" inside each edge of the ribbon; they detect extreme, unacceptable movement of the ribbon and trigger interruption of printing.

When ribbon R moves right or left enough to uncover a first detector unit PS or PS', a DC gearmotor M-1 is thereupon energized to rotate, respectively, clockwise or counterclockwise. Motor M-1 operates through a synchronous belt/pulley drive, to rotate its shaft assembly sh-h clockwise or ccw. Attached to sh-h are two extension-spring arms, whose extension springs SP, SP' provide the cw/ccw pinch-roller force. When shaft sh-h is rotated, it changes the lengths of the two extension springs, thus loading/unloading the pinch rollers to thereby cause an unequal force distribution (4-to-1). Left pinch roller PR' has a left-hand lead-screw pattern and right roller PR has a right-hand lead-screw pattern.

During normal operation (balanced, equal pinch forces), rollers PR, PR' tension ribbon R across its width. but when PS or PS' detects "wander" and cause motor M-1 to rotate sh-h (and or pinch-forces thus become unequal), the roller with the higher pinch-force takes control of ribbon R and moves it toward that side—until, R returns enough to re-cover the detector. When the detector is recovered, motor M-1 is de-energized and pinch roller forces become re-balanced.

Thus, one can assume that ribbon R is preferably step-advanced in the following exemplary fashion, at 4.91"/sec. The (0.75") drive roller DR is coupled (2:1) to stepping motor DM (motor:drive roller via pulley, belt drive). For one ribbon advance-length, fifty (50) clock pulses are sent to the stepping motor during a 36 ms time period. Motor DM steps 200 times per revolution, or 1.8° for each step; and each two pulses move the motor one more step. Drive roller DR is advance 22.5° (0.1473 of ribbon) for each ribbon advance-length (50 clock pulses).

Software preferably controls this advance of MICR ribbon, one line at a time, while also adjusting ribbon step-distance (cf. can be set to one of six possible settings, scaled from −2 to +3). The minimum setting for step-distance corresponds to 0.148 in. of travel. Each increment increases ribbon step distance 0.015 in.; and, the maximum step distance is 0.221 in.

The magnetic ink transfer ribbon R can be any ribbon suitable for encoding MICR-E13B characters.

Our High-Speed Encoder Print Station preferably uses a one-shot (print-once), 2.25-inch wide, towel type ribbon, 400 yards long (can print 95,000 lines, lasting for approximately ten hours of average continuous encoding). A ribbon package can comprise a 4-inch diameter ribbon roll and a plastic takeup spool and may have the following specifications:

| | |
|---|---|
| Ribbon Width: | 2.25 inches (57.2 MM) |
| Length: | 400 yards (304.8 M) |
| Roll diameter: | 4.00 inches max |
| Ribbon capacity: | 95,000 character lines per roll |

RIBBON CHANGING

The ribbon is made accessible by lifting the flap cover on top of the Encoder module. Pressing a lift button located at the left side of the encoder will raise it 5.25" to its "maintenance position" for ribbon replacement. The ribbon will typically need changing after approximately continuous ten hours of encoding. The operator will remove the spent ribbon and thread-in a new ribbon. Then, the operator can press the lift button and push and encoder down to its "operating position"—whereupon the machine will automatically eject 15 inches of ribbon to ensure fresh ribbon at the print station.

Figure 14:
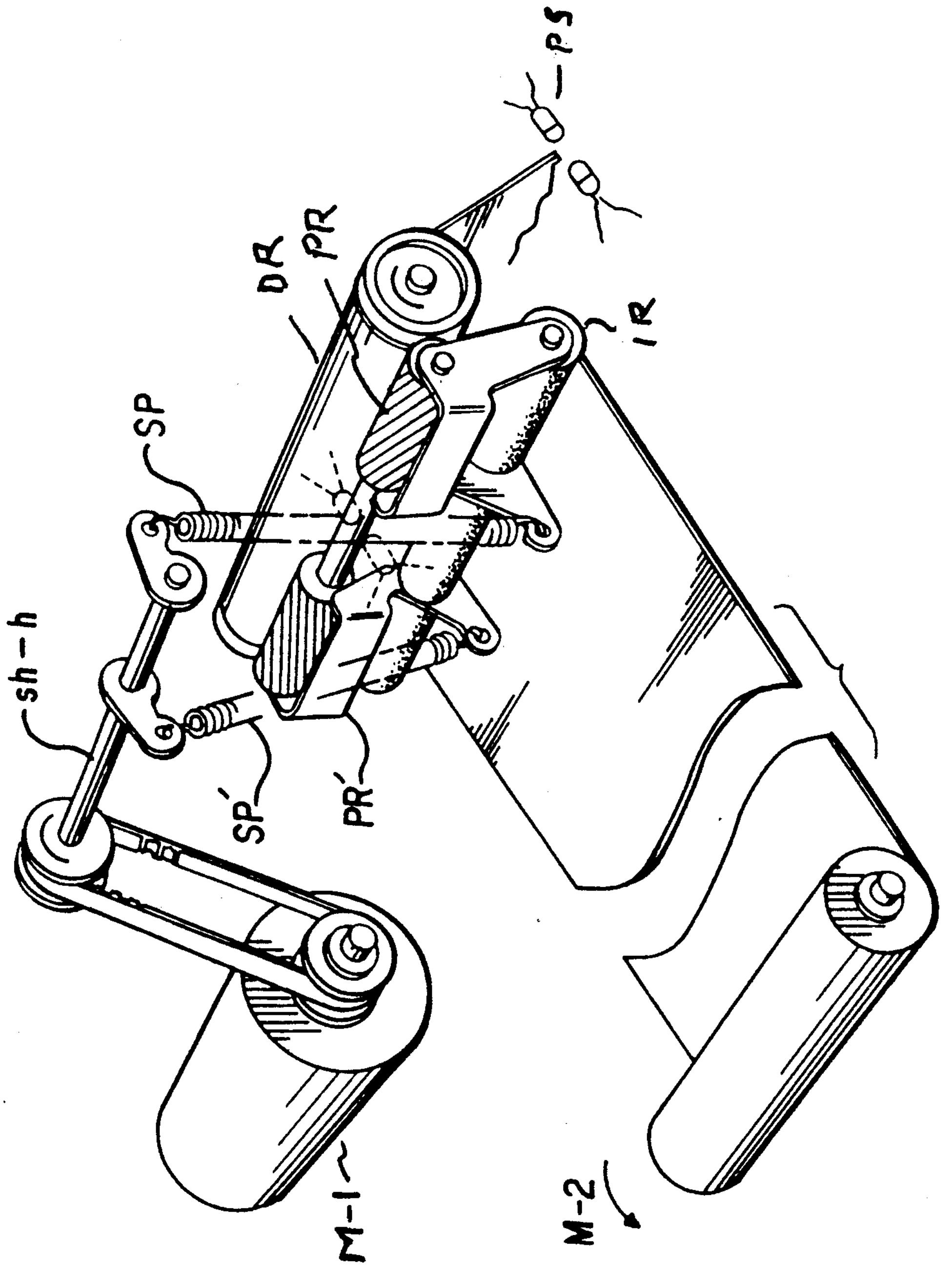
FIG. 14 is a partial-perspective of only the ribbon-advance portions.
Figure 20:
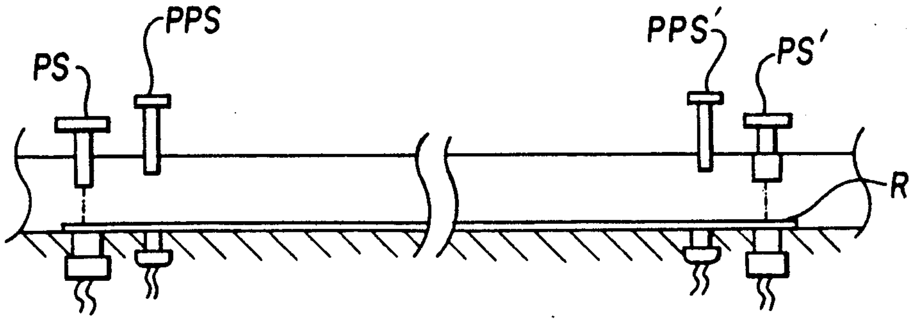
FIG. 20 is a schematic side view of ribbon-edge sensors.

Skew-Correction (FIGS. 14, 20)

Because of the friction-drive (and possible other slippage), print ribbon R is apt to "skew" or wander out of alignment, According to a feature hereof, we have provided simple means for sensing and correcting "skew" (wander) as the ribbon passes along its roller path, and we provide means for automatically "straightening" ribbon alignment (deskewing).

When ribbon R wanders too far to one side or the other of its advance-path, this ("skew") is sensed by one of two photosensor units PS, PS' each positioned just beyond a respective ribbon-edge to detect misalignment. When either sensor PS, PS' detects "presence" (alternatively, "non-presence") of a ribbon-edge, it will operate to energize DC servo motor M-1. Motor M-1 is commanded by output from PS or PS' to rotate, either CW or CCW to oppositely-pivot rocker means, and so selectively increase the "pinch-force" (on R) by one associated pinch roll (PR or PR'), while concurrently decreasing the pinch-force of the other pinch roll, thus causing unequal drag-forces on ribbon R. M-1 does this (as mentioned) by changing the lengths of the two extension springs to SP, SP' , using rocker means or the like, each loading or unloading a respective pinch roller. This length-change "unbalances" pinch-forces (causes an unequal force distribution) and frees ribbon R to move away from the "lower-force" pinch roller—whereupon R will rotate about, and move toward, the "higher-force pinch roller"—and so shift-back to correct the skew. When ribbon R has so shifted sufficient to "clear" the "active" sensor, (PS or PS'), the sensor will become deactivated (as will motor M-1) and skew will have been corrected.

Tracking Ribbon-Advance

A ribbon motion detector is provided to insure the ribbon advances one 0.147" "length" prior to each print command. Detection of ribbon motion is via a sensor tracking the rotation of low-inertia idler TTR; that is, whenever ribbon R moves, its friction-engagement vs idler TTR will rotate TTR—this rotation being sensed by an opto-electronic sensor AOR that generates pulses as a function of TTR-rotation-amount.

"Optical Rotation Encoder" AOR, or an equivalent means, can be used to sense the rotation of idler roll TTR (SEE FIG. 12) as its is moved by the ribbon; and so sense roll-rotation as a measure of "ribbon movement".

Ribbon R wraps 70°-90° around the 0.625 diameter urethane-coated idler roller TTR. Roller TTR rotates 0.027 for each ribbon advance, being driven by the ribbon. One end of the shaft for TTR is coupled to shaft encoder AOR through a 36:20 (roller:encoder) gear ratio. Shaft encoder AOR outputs 128 pulses for each revoluation of TTR and expects to detect 17-18 pulses for each ribbon step-advance. If the shaft encoder does not detect "proper" ribbon motion (e.g. minimum requirement of 10 pulses), one "retry" will be invoked before a "fault" is reported (as part of the "status" to the DP-1).

As the ribbon moves, the A-OR encoder moves and outputs regular "advance-pulses" ap (e.g. if it moves to generate 12 such pulses and if this is "standard advance-length" for the ribbon, such is signalled to the Encoder, i.e. "that ribbon R has moved enough to accommodate the next imprinting"). Thus, a section of "fresh" ribbon (ribbon segment just beyond the last impact area) is provided before each imprint sequence. Unless the print-once ribbon R so moves to a clean area, "errors" can result from imprinting with depleted ribbon.

Figure 12:
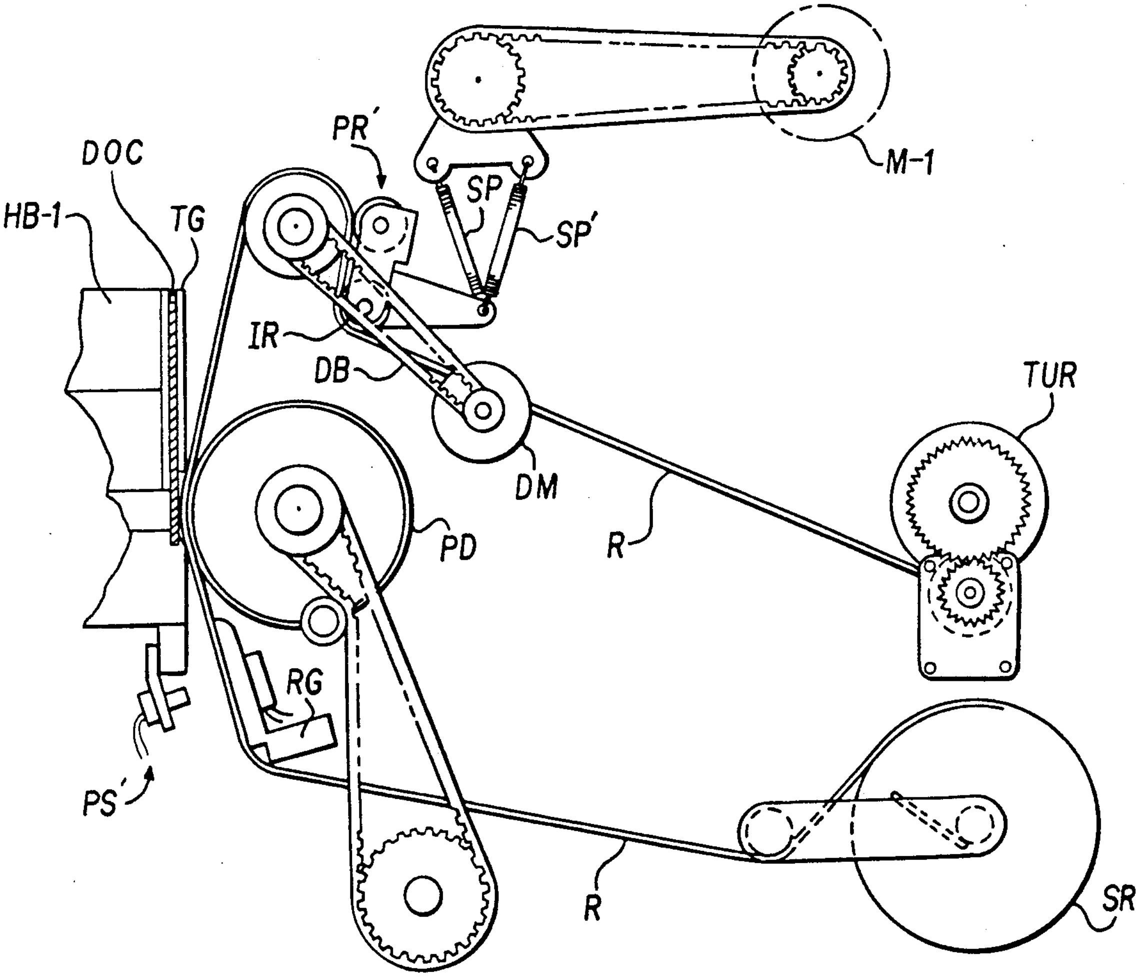
Figure 13:
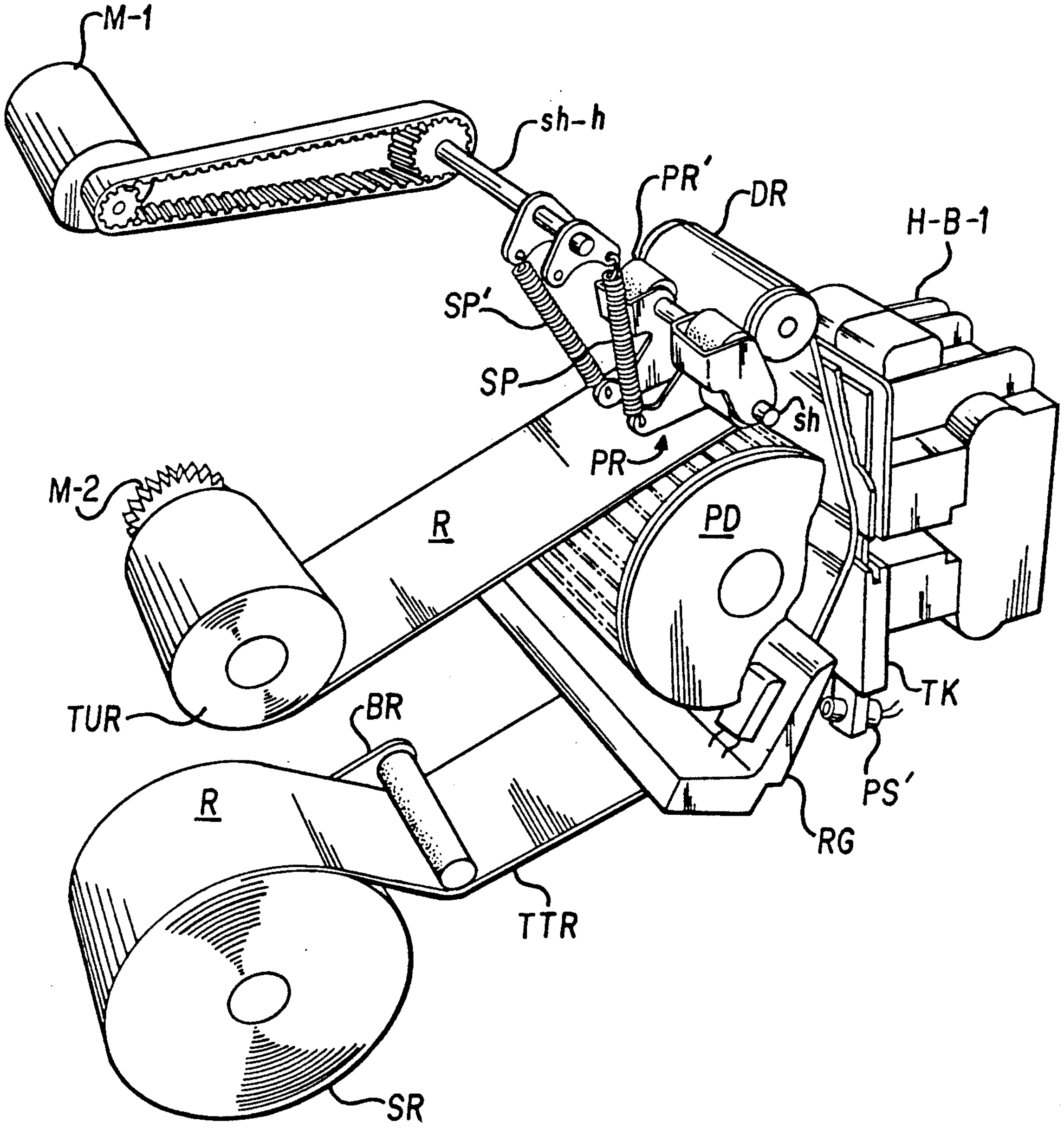
FIG. 13 shows the array in upper perspective.

If, in so detecting ribbon-advance, the machine finds that ribbon R hasn't advanced enough, it will command R to "advance further before the next hammer-impact'-'(e.g. until A-OR outputs a total of 12 advance-pulses). [Note: FIGS. 12, 12A also indicate track-guide RG with track-bottom portion TR, along with print drum PD and hammer-banks HB-1, HB-2]

"Ribbon-Out" Condition (end-of-ribbon)

"Ribbon-out" is detected 12" from the end of the ribbon supply and interrupts all processing. For this, two electrically-separated (potential-difference) contacts provided on the machine sense passage of a metallic strip adhered on the back-side of the ribbon (located 12 inches from its end) and report a "ribbon-out" condition (as a "status") to document processor DP-1. A "Ribbon-out" indication stops all processing. In particular, the two contacts are preloaded against the back side of the ribbon, prior to it entering the print station. "Out of ribbon" is detected when the metallic strip passes onto both contacts and completes the associated sensing-circuit.

Figure 15:
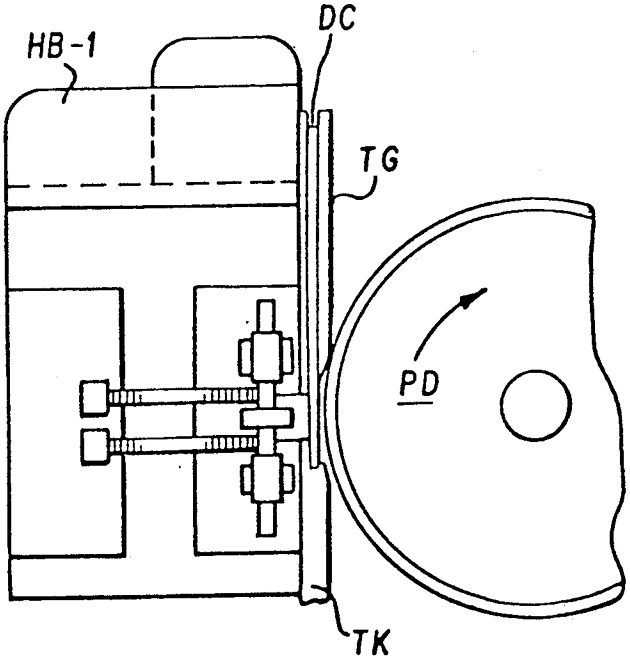
FIG. 15 shows the Drum and hammers in side view.

"Low Ribbon" condition: (FIG. 15)

A "low ribbon" detector LR reports "low ribbon" condition (e.g. MIN 5000 imprintings remain) to the document processor DP-1 when approximately 75 feet of ribbon remains on the spool. Detector LR operates by measuring the pulses per revolution of the ribbon supply mandrel S-M. Optical sensor LR emits 8 pulses per mandrel revolution. As the ribbon supply depletes, the rpm of mandrel M-S will increase, thus reducing the time between output pulses. At a "Target" rpm (corresponding to "only-75'-left" condition), the detector reports "Low-Ribbon" condition as a "status" to DP-1.

RIBBON MOTION—(Postprinting)

During ribbon advance, the Encoder module verifies ribbon motion, with faults reported as part of STATUS. Acceptable ribbon movement requires at least two pulses from the ribbon motion detector. The Encoder-processor will automatically try to move the ribbon a second time if the first fails, but the maximum time to complete ribbon-advance (including "automatic retry"), is 70 ms.

Machine tests: (see FIG. 18)

The HSPE Module verifies: proper sensor operation, proper document length and spacing; and also detects jams.

The HSPE Module also checks for "general" errors; in particular: errors in ribbon movement, in printing, and general (hardware and functional) errors. Detectable faults are reported to DP-1 so it may initiate appropriate recovery action.

"No-Encode Errors" are also detected; these are faults which are detected before printing, and result in the document being released without being printed-upon, e.g. such faults as: document skew, document position error, print drum speed incorrect, no ribbon advance after prior document encoding, and ribbon skew.

"Improper Encoding Errors" are detected after the document has been encoded and result in a document which will require an encoding correction; such as: hammer current failure, hammer flight failure and extra "drum character" clocks.

"Undetected Errors" are faults which will not be detected until the document has been passed through a reader; such as: damaged drum, damaged hammer tip, or bad ribbon.

It will be understood that the preferred embodiments described herein are only exemplary, and that the invention is capable of many modifications and variations in construction, arrangement and use without departing from the spirit of the invention.

Since modifications of the invention are possible, for example, the means and methods disclosed herein are also applicable to other encoding arrangements, as well as to other related document handling systems. The present invention is also applicable for enhancing other related printing arrangements.

The above examples of possible variations of the present invention are merely illustrative. Accordingly, the present invention is to be considered as including all possible modifications and variations coming with in the scope of the invention as defined by the appended claims.

What is claimed is:

1. In a web-transport arrangement wherein web means are advanced without sidewise-constraint, along a prescribed path, a method of detecting and automatically correcting "wander" of the web-means to either side of this path, this method involving:

disposing at least one edge-sensor means along this path segment whereby to indicate web-wander to the Right or to the Left by outputting respective "Gone-left" or "Gone-Right" signals; rotatably-mounting a pair of spaced, like contact-roller means on prescribed shaft means to each be in similar, moderately-loose contact with said web means for normal advancement thereof along said path; each said contact-roller means being also coupled, through a respective rocker means, to said shaft means, the respective rocker means being spring-biased to be resiliently urged, respectively, against clockwise, or counterclockwise rotation; providing selectively-operated Rotation means coupled to receive said signals; and motive means coupled to selectively rotate said shaft means a few degrees Clockwise or Counterclockwise, according to whether it receives said "Gone-Left" or said "Gone-Right" signals; whereby to so urge a respective one of the roller-means into tighter engagement with said web means, while contemporaneously urging the other roller means oppositely, and so as to less-tightly engage said web means, to thereby tend to correct the wander as it continues to advance the web.

2. The method of claim 1 wherein said edge-sensor means comprise at least one pair of optical sensor means, one monitoring the Right-web-edge, and the other monitoring the Left.

3. The method of claim 2 wherein said optical sensor means each indicate when a respective web-edge uncovers it.

4. The method of claim 2 wherein each said optical sensor means indicates when a respective web-edge covers it.

5. The method of claim 2 where two pairs of such optical sensor means are so provided: a "Regular" pair for indicating "wander" of a respective edge over a "normal range"; and an "Extreme" pair for indicating "extreme-wander" and, in turn, causing system SHUTDOWN.

6. An "anti-wander" webtransport arrangement wherein web-means are intermittently advanced, while being optically-monitored for misalignment along the transport-path, while also being automatically urged back into proper alignment along this path; this arrangement including web means advance intermittently, stepwise, along a prescribed path, and anti-wander means provided for detecting and automatically correcting "wander" of the web-means off a prescribed segment of this path, this anti-wander means including at least one edge-sensor means disposed along this path segment whereby to indicate web-wander to the Right or to the Left by outputting respective "Gone-left" or "Gone-Right" signals; plus a pair of spaced, like contact-roller means rotatably-mounted on prescribed shaft means to each be in similar, moderately-loose contact with said web means; each said contact-roller means being also coupled, through a respective rocker means, to said shaft means, the respective rocker means being spring-biased to be resiliently urged, respectively, against clockwise, or counterclockwise rotation; providing selectively-operated Rotation means coupled to receive said signals; and motive means coupled to selectively rotate said shaft means a few degrees Clockwise or Counter-clockwise, according to whether it receives said "Gone-Left" or said "Gone-Right" signals; whereby to so urge a respective one of the roller-means into tighter engagement with said web mean, while contemporaneously urging the other roller means oppositely, and so as to less-tightly engage said web means.

7. The invention of claim 6 wherein said edge-sensor means comprise at least one pair of optical sensor means, one monitoring the Right-web-edge, and the other monitoring the Left.

8. The invention of claim 7 wherein said optical sensor means each indicate when a respective web-edge uncovers it.

9. The invention of claim 8 wherein each said Sensor means indicates when a respective web-edge covers it.

10. The invention of claim 9 where two pairs of such optical sensor means are so provided: a "Regular" pair for indicating "wander" of a respective edge over a "normal range"; and an "Extreme" pair for indicating "extreme-wander" and, in turn, causing system SHUT-DOWN.

11. An "anti-wander" web-transport arrangement wherein web-means are intermittently advanced along a transport-path, while being optically-monitored for misalignment and while also being automatically urged sidewise back into proper alignment along this path, this arrangement including independent left and right roll means mounted on common shaft means for advancing the web means, plus common, selectively-operated shaft-rotation means for rotating said shaft means either clockwise or counterclockwise in response to sensed misalignment to thereby throw either roll means into firmer contact with its side of the web means and so automatically counter-act the sensed misalignment.

12. The arrangement of claim 11 wherein said sensor means are provided for indicating degree of misalignment.

13. The arrangement of claim 12 wherein said sensor means indicates extreme-misalignment and the arrangement is controlled to responsively shut-down.

14. An "anti-wander" web-transport arrangement wherein web-means are advanced, without sidewise constraint while being monitored for misalignment left or right along a prescribed transport-path, while also being selectively and automatically urged sidewise, back into proper alignment along this path, this arrangement including left and right roll means mounted on shaft means for advancing the respective left and right sides of the web means, plus selectively operated shaft-rotation means for rotating said shaft means either clockwise or counterclockwise in response to sensed misalignment; and edge-sensor means for indicating web-wander to the Right or to the Left by outputting respective "Gone-left" or "Gone-Right" signals; these signals being inputted to said rotation means whereby to urge a respective one of the roll-means into tighter engagement with the respective edge of said web means, while contemporaneously urging the other roller means oppositely, and so as to less-tightly engage said web means.

* * * * *